US012675999B2

(12) United States Patent
Pawan Prasad et al.

(10) Patent No.: US 12,675,999 B2
(45) Date of Patent: Jul. 7, 2026

(54) METHOD AND SYSTEM FOR GENERATING HIGH RESOLUTION PEAK ACTION FRAME

(71) Applicant: SAMSUNG ELECTRONICS CO., LTD., Suwon-si (KR)

(72) Inventors: Bindigan Hariprasanna Pawan Prasad, Bangalore (IN); Green Rosh K S, Bangalore (IN); Vishakha S R, Bangalore (IN); Lokesh Rayasandra Boregowda, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 244 days.

(21) Appl. No.: 18/646,349

(22) Filed: Apr. 25, 2024

(65) Prior Publication Data

US 2024/0273904 A1    Aug. 15, 2024

Related U.S. Application Data

(63) Continuation of application No. PCT/KR2022/016371, filed on Oct. 25, 2022.

(30) Foreign Application Priority Data

Oct. 25, 2021    (IN) ............................. 202141048745
Sep. 19, 2022    (IN) ............................. 202141048745

(51) Int. Cl.
*G06V 20/40*         (2022.01)
*G06T 7/20*          (2017.01)
(Continued)

(52) U.S. Cl.
CPC ................ *G06V 20/48* (2022.01); *G06T 7/20* (2013.01); *G06T 7/70* (2017.01); *G06V 10/761* (2022.01); *G06T 2207/20084* (2013.01)

(58) Field of Classification Search
CPC .. G06V 20/48; G06T 7/20; G06T 7/70; G06T 7/761; G06T 7/246; G06T 2207/20084; G06T 2207/30196; G06T 3/4053
See application file for complete search history.

(56) References Cited

U.S. PATENT DOCUMENTS 9,911,032 B2    3/2018   Shotton et al.
10,701,394 B1   6/2020   Caballero et al.
(Continued)

FOREIGN PATENT DOCUMENTS

CN    111368786 A    7/2020
CN    113111844 A    7/2021
(Continued)

OTHER PUBLICATIONS

International Search Report (PCT/ISA/210) issued Feb. 2, 2023 by the International Searching Authority in International Patent Application No. PCT/KR2022/016371.
(Continued)

*Primary Examiner* — John B Strege
(74) *Attorney, Agent, or Firm* — Sughrue Mion, PLLC

(57) ABSTRACT

There is provided a method and electronic device for generating high resolution peak action frame. The method includes receiving a low resolution (LR) image stream with high frame speed and a high resolution (HR) image stream with low frame speed and detecting at least one pose of at least one human in the LR image stream. The method further includes obtaining a LR peak action frame in the LR image stream based on the at least one pose and identifying a close HR frame from the HR image stream which is closest to the LR peak action frame. The method further includes fetching the close HR frame from the HR image stream which is closest to the obtained LR peak action frame or generating
(Continued)

a HR peak action frame by blending the identified HR frame and the LR peak action frame.

15 Claims, 23 Drawing Sheets

(51) Int. Cl.
   *G06T 7/70*     (2017.01)
   *G06V 10/74*    (2022.01)

(56) References Cited

U.S. PATENT DOCUMENTS

| | | | |
|---|---|---|---|
| 2009/0153694 A1 | 6/2009 | Takayama | |
| 2014/0218553 A1* | 8/2014 | Deever | H04N 23/81 |
| | | | 348/218.1 |
| 2015/0364158 A1* | 12/2015 | Gupte | H04N 5/144 |
| | | | 386/223 |
| 2019/0366153 A1 | 12/2019 | Zhang et al. | |
| 2020/0068129 A1 | 2/2020 | Silverstein et al. | |

FOREIGN PATENT DOCUMENTS

| | | |
|---|---|---|
| KR | 10-2015-0132672 A | 11/2015 |
| KR | 10-2020-0122596 A | 10/2020 |
| KR | 10-2020-0138668 A | 12/2020 |

OTHER PUBLICATIONS

Written Opinion (PCT/ISA/237) issued Feb. 2, 2023 by the International Searching Authority in International Patent Application No. PCT/KR2022/016371.

Hajime Nagaharaf et al., "High-resolution Video Generation Using Morphing", 18th International Conference on Pattern Recognition (ICPR'06), vol. 4, Jan. 1, 2006 (Jan. 1, 2006), pp. 338-341, XP055835669, US ISSN: 1051-4651, DOI: 10.1109/ICPR.2006.626.

European Extended Search Report issued Jan. 7, 2025 by the European Patent Office for EP Patent Application No. 22887566.2.

Communication dated Dec. 17, 2025, issued by the INDIA Patent Office in Indian Patent Application No. 202141048745.

* cited by examiner

FIG. 6

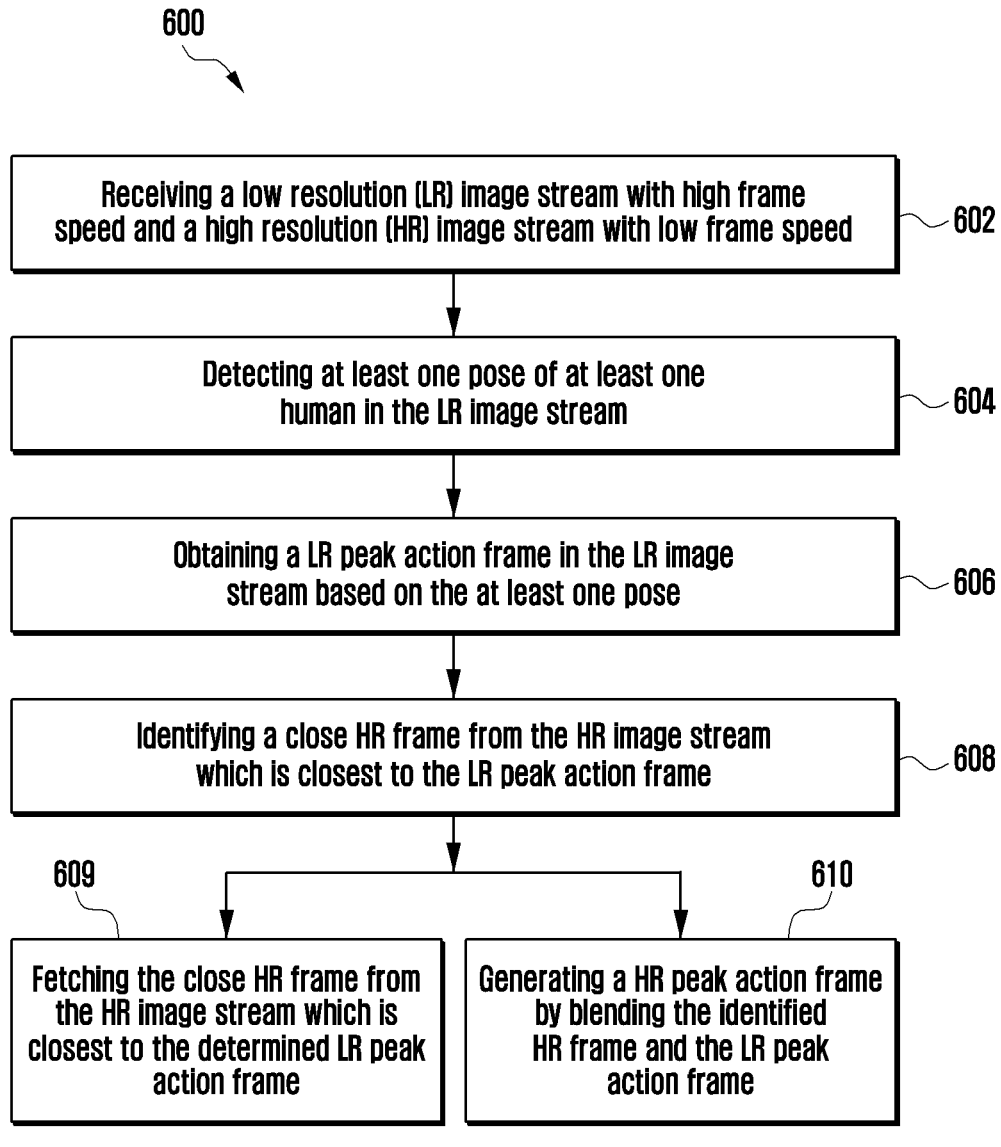

600

| Receiving a low resolution (LR) image stream with high frame speed and a high resolution (HR) image stream with low frame speed | 602 |

Detecting at least one pose of at least one human in the LR image stream — 604

Obtaining a LR peak action frame in the LR image stream based on the at least one pose — 606

Identifying a close HR frame from the HR image stream which is closest to the LR peak action frame — 608

609

Fetching the close HR frame from the HR image stream which is closest to the determined LR peak action frame

610

Generating a HR peak action frame by blending the identified HR frame and the LR peak action frame

METHOD AND SYSTEM FOR GENERATING HIGH RESOLUTION PEAK ACTION FRAME

CROSS-REFERENCE TO RELATED APPLICATION

This application is a bypass continuation application of International Application No. PCT/KR2022/016371, filed on Oct. 25, 2022, which is based on and claims priority under 35 U.S.C. § 119 to Indian Patent Non-Provisional Patent Application No. 202141048745, filed on Sep. 19, 2022, and Indian Provisional Patent Application No. 202141048745, filed on Oct. 25, 2021, the disclosures of which are incorporated herein by reference in their entireties.

BACKGROUND

1. Field

The disclosure relates to an electronic device and a method of operating the electronic device, and in particular, the disclosure relates to a method and an electronic device for generating high resolution peak action frame.

2 Description of Related Art

Generally, while performing image capturing during an action sequence, users may be interested in capturing a High Resolution (HR) peak action frame. For example, in an action sequence such as jump, users may be interested in capturing a HR image of a highest point of the jump. Moreover, some applications may require HR quality peak action frame for further processing.

Further, while related art system can generate Low Resolution (LR) frames at high frame rates, it is not possible for the related art system to generate the HR peak action frames at high frame rates. Therefore, HR peak action frame is often not captured in the low frame rate of the HR frame stream.

SUMMARY

One or more aspect of the disclosure may address the above mentioned disadvantages or other shortcomings in the related art image capturing systems. However, the disclosure is not limited to, and as such, other aspects of the disclosure may provide other benefits, such as, but not limited to, to improved HR peak frame detection.

One or more aspects of the disclosure may provide a method and electronic device for generating high resolution peak action frame. The method may include identifying a High Resolution (HR) frame from the HR image stream which is closest to a Low Resolution (LR) peak action frame and generating a HR peak action frame by blending the identified HR frame and the LR peak action frame.

One or more aspects of the disclosure may provide a method and electronic device for identifying at least one of a velocity and an angle of action of a subject based on action recoil cues and predict time and location of the peak action of the subject. The method may further include determining a LR peak action frame based on the prediction and a number of LR frame capture per second.

One or more aspects of the disclosure may provide a method and electronic device for determining a slow motion start time and end time based on at least one of the arrival time of the peak action frame and generating a slow motion video segment for the determined slow motion start time and end time.

According to an aspect of the disclosure, there is provided a method including receiving a low resolution (LR) image stream with a first frame speed and a high resolution (HR) image stream with a second frame speed, the first frame speed being greater than the second frame speed, and the LR image stream having a resolution lower than the HR image stream, detecting at least one pose of at least one subject in the LR image stream, obtaining a LR peak action frame in the LR image stream based on the at least one pose, identifying a first HR frame from the HR image stream, the first HR frame being closest to the LR peak action frame and performing at least one of: fetching the first HR frame from the HR image stream; or generating a HR peak action frame by blending the first HR frame and the LR peak action frame.

The detecting the at least one pose of the at least one subject in the LR image stream may include: receiving the LR image stream, analyzing the LR image stream with a deep neural network (DNN) and detecting the at least one pose, wherein the at least one pose indicates a beginning of an action by the at least one subject using the DNN.

The identifying the first HR frame may include: initiating a video recording by a LR capture of a scene having the at least one subject, detecting the at least one pose of the at least one subject in the scene, the at least one pose indicating a beginning of an action by the at least one subject, initiating an Artificial Intelligence (AI) module to track a path of the action of the at least one subject, initiating a HR capture of the scene in parallel to the initiating of the AI module, fetching at least two candidate frames closer to a peak of the action of the at least one subject from the LR image stream using the AI module, obtaining the LR peak action frame containing the peak of the action of the at least one subject from among the at least two candidate frames, and identifying the first HR frame, which is closest to the LR peak action frame, from the HR image stream.

The obtaining the LR peak action frame may include: generating at least one key point of the at least one subject using a deep neural network (DNN), detecting an action recoil cue by matching optical flow of the at least one key point of the at least one subject with a pattern during a movement of the at least one subject, identifying at least one of velocity and angle of action of the at least one subject based on the movement of the at least one key point based on the action recoil cue, predicting time and location of a peak action of the at least one subject based on the identified at least one of velocity and angle of action of the at least one subject and obtaining the LR peak action frame based on the predicted time and location of the peak action and a number of LR frame capture per second.

The identifying the first HR frame may include: receiving the HR image stream, receiving the LR peak action frame; updating an offset of the HR image stream based on the LR peak action frame, and identifying the first HR frame that is closest to the LR peak action frame from the updated HR image stream.

The generating the HR peak action frame may include: identifying the first HR frame from the HR image stream which is closest to the LR peak action frame using the action recoil cue, aligning the first HR frame at least one of geometrically and photometrically with the LR peak action frame, obtaining a motion map by estimating motion differences between the aligned first HR frame and the LR peak action frame, blending the aligned first HR frame and the LR peak action frame using the motion map and generating the HR peak action frame with high resolution components in a background and one or more peak action regions based on the blending of the aligned first HR frame and the LR peak action frame.

The method may include: receiving an image stream with the second frame speed, detecting an action recoil cue based on a movement of the at least one subject, predicting an arrival time of a peak action frame based on the detected action recoil cue, obtaining a slow motion start time and a slow motion end time based on at least one of the arrival time of the peak action frame, a slow motion buffer size and a target frame speed, the target frame speed greater than the second frame speed, modifying a frame rate of the received image stream to the target frame speed and generating a slow motion video segment for the slow motion start time and the slow motion end time based on the modified frame rate.

According to an aspect of the disclosure, there is provided an electronic device including: a memory storing one or more instructions; and one or more processors operably coupled to the memory and configured to execute the one or more instructions to: receive a low resolution (LR) image stream with a first frame speed and a high resolution (HR) image stream with a second frame speed, the first frame speed being greater than the second frame speed, and the LR image stream having a resolution lower than the HR image stream, detect at least one pose of at least one subject in the LR image stream, obtain a LR peak action frame in the LR image stream based on the at least one pose, identify a first HR frame from the HR image stream, the first HR frame being closest to the LR peak action frame and perform at least one of: fetch the first HR frame from the HR image stream; or generate a HR peak action frame by blending the first HR frame and the LR peak action frame.

The one or more processors may be further configured to execute the one or more instructions to: receive an image stream, detect an action recoil cue in the image stream based on a movement of the at least one subject, and adjust a zoom factor based on the detected action recoil cue.

BRIEF DESCRIPTION OF DRAWINGS

Embodiments of the disclosure are illustrated in the accompanying drawings, throughout which like reference letters indicate corresponding parts in the various figures. The embodiments herein will be better understood from the following description with reference to the drawings, in which:

FIG. 6 is a flow diagram illustrating a method for generating high resolution peak action frame, according to an embodiment of the disclosure;

FIG. 8 is a schematic diagram illustrating usability and scalability of multiple Image Signal Processor, according to an embodiment of the disclosure;

FIG. 13 is a flow chart illustrating a motion compensated blending, according to an embodiment of the disclosure;

FIG. 14 is a diagram illustrating a high resolution peak frame for jump actions, according to an embodiment of the disclosure;

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be constructed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. However, the disclosure is not limited thereto, and as such, the blocks, which may be referred to herein as managers, units, modules, or the like, may be software modules implemented by software codes, program codes, software instructions, or the like. The software modules may be executed on a processor.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings.

Figure 1:
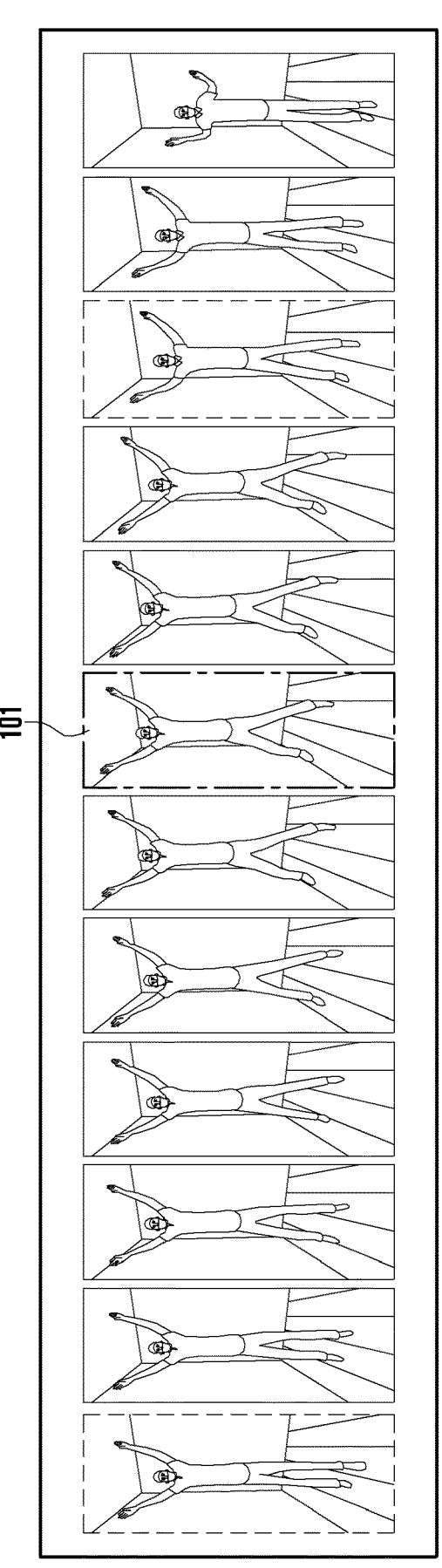
FIG. 1 is a diagram illustrating frames captured from a low resolution image stream with high frame speed, according to a related art system.

FIG. 1 is a diagram illustrating frames captured from a low resolution image stream with high frame speed, according to a related art system.

During an action sequence, a user may be interested in capturing the most important or desired moments. In FIG. 1, a jump sequence captured from a low resolution image stream with high frame speed is shown. The high frame speed may be 30 frames per second (FPS). However, the disclosure is not limited thereto, the frame speed may be higher than 30 FPS. According to an embodiment, the high frame speed may be frame speed greater than or equal to a reference frame speed, and low frame speed may be frame speed less than the reference frame speed. In FIG. 1, a frame (101) may be the detected peak action frame in low resolution (LR). However, a user may be interested in obtaining a high resolution (HR) peak action frame. While the related art electronic devices, such as smartphones, may generate low resolution (LR) frames at 30 FPS, it is impossible for the related art electronic devices to generate a high resolution (HR) frames (for example, greater than 12 megapixels (MPs)) at high frame rates (for example, greater than 24 FPS) to obtain the HR peak action frame. However, the disclosure is not limited thereto, and as such, the high resolution frames may be frames having a resolution greater than or equal to a reference resolution, and low resolution frames may be frames having resolution less than the reference resolution.

Figure 2A:
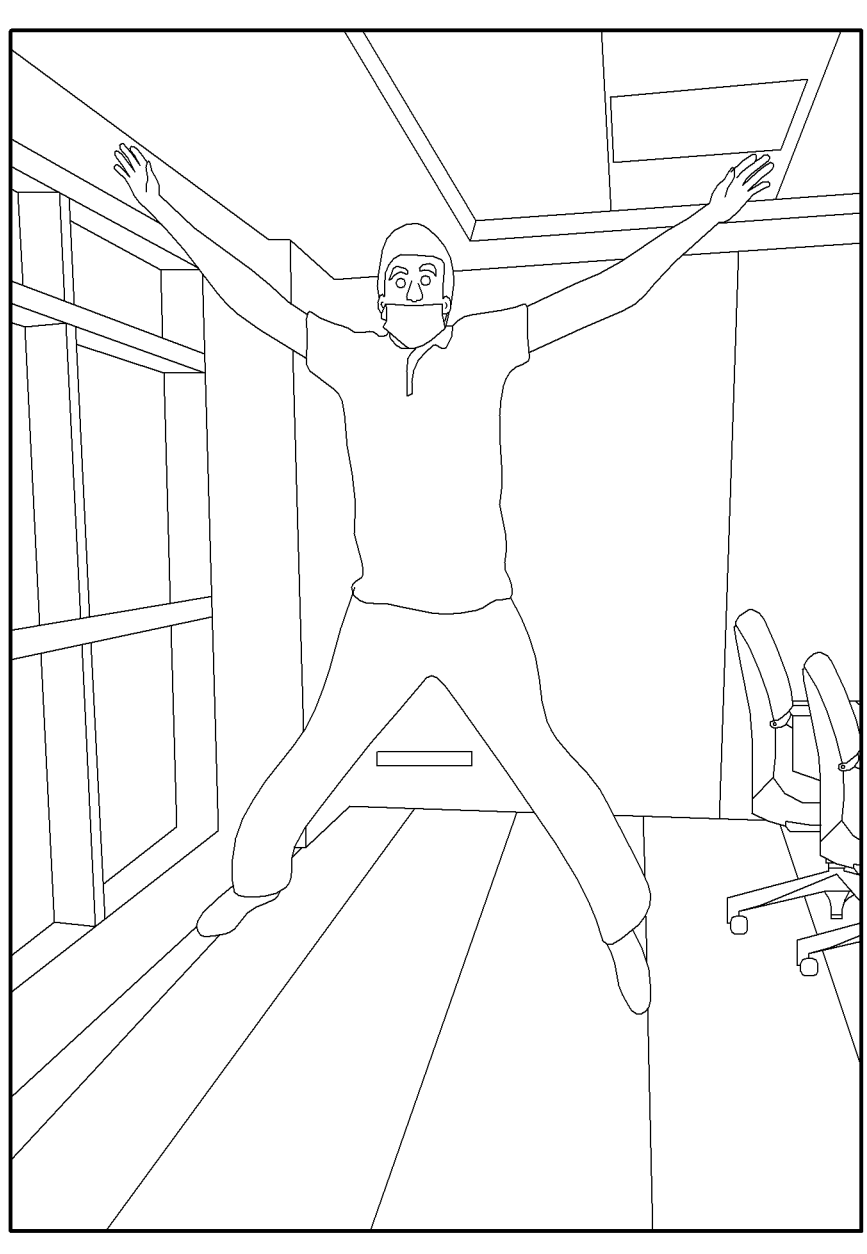
FIGS. 2A, 2B and 2C are diagrams illustrating frames captured from a high resolution image stream with low frame speed, according to a related art system.
Figure 2B:
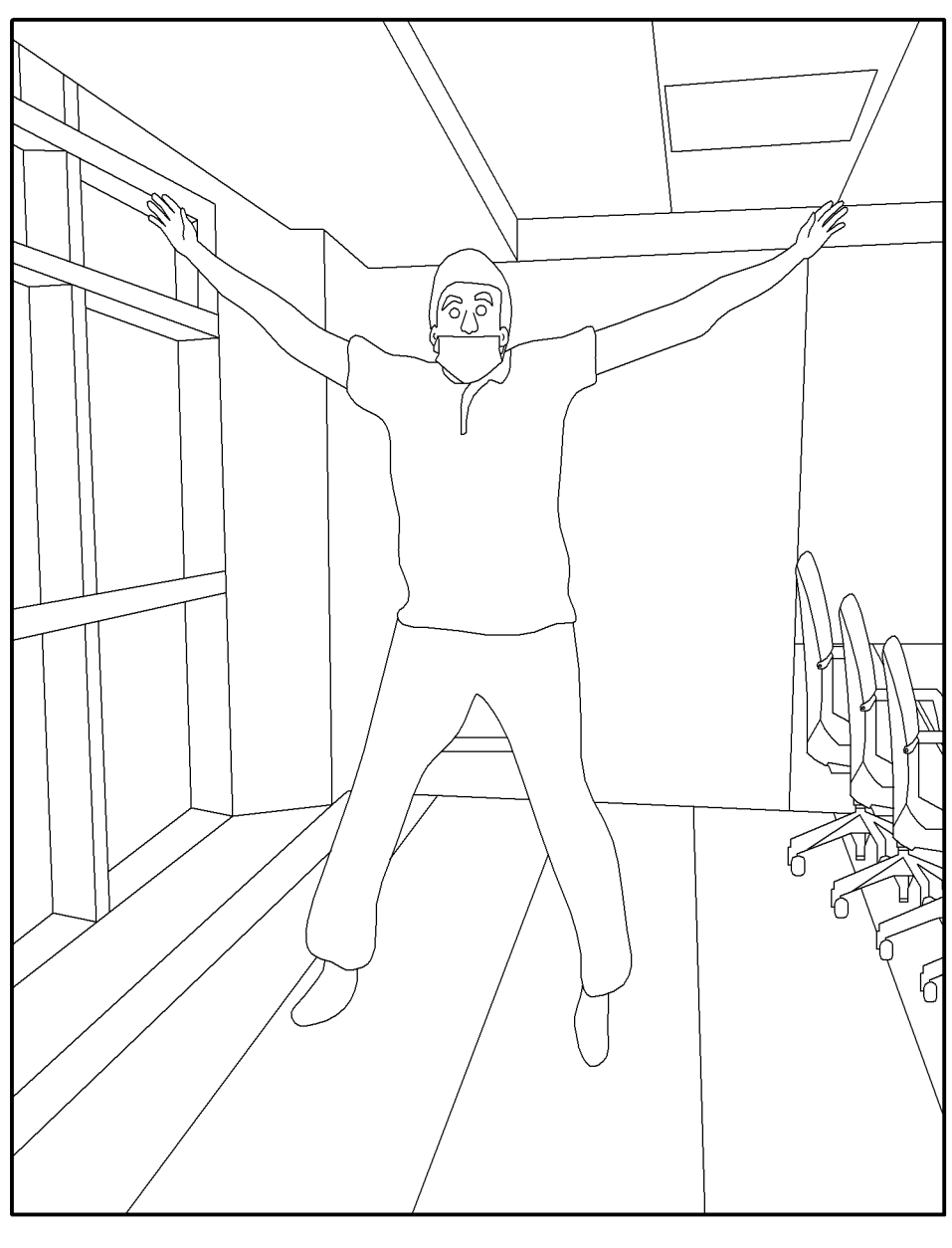
Figure 2C:
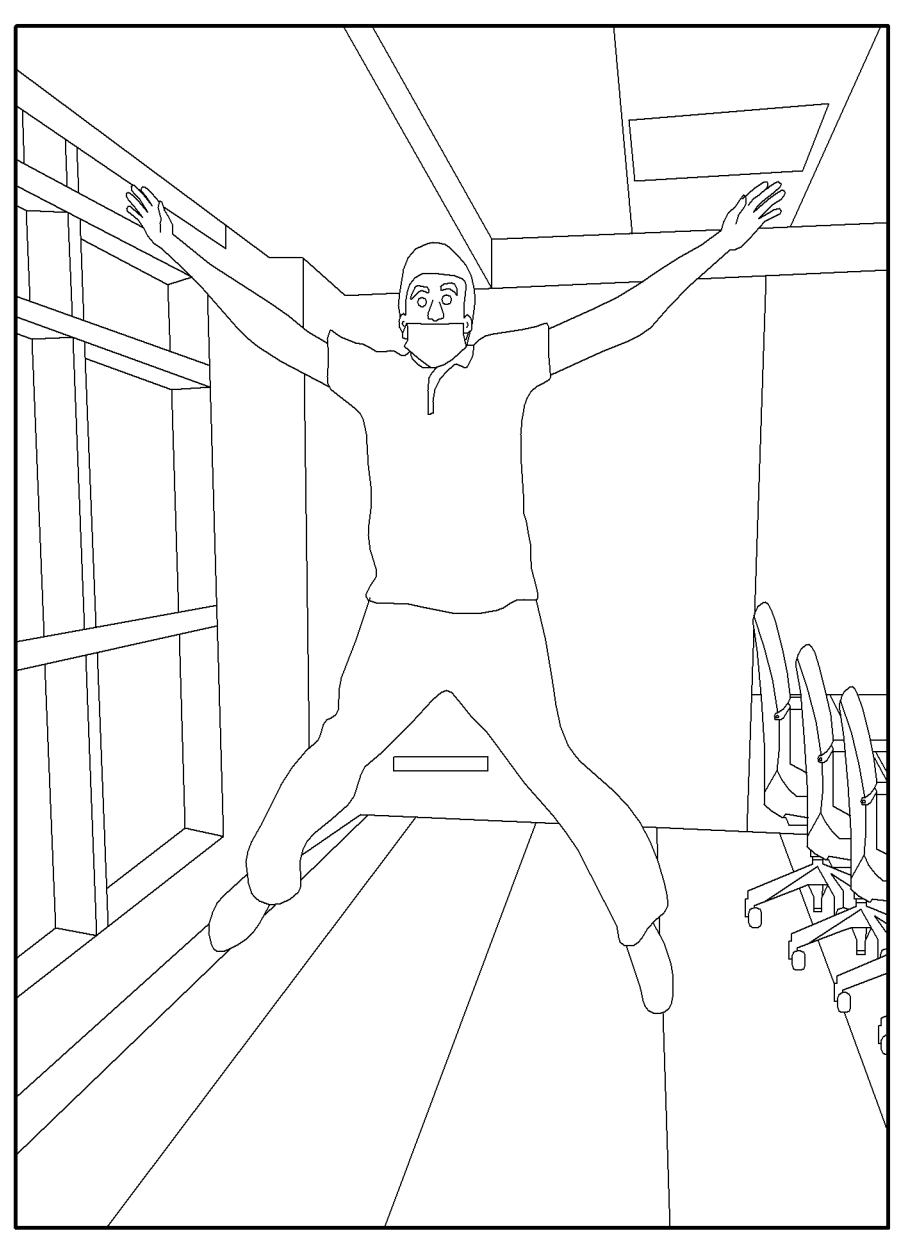

FIGS. 2A, 2B and 2C are diagrams illustrating frames captured from a high resolution image stream with low frame speed, according to a related art system.

Referring to FIGS. 2A, 2B and 2C, according to an example illustration, the HR stream is being captured at 3 FPS, and as such, the HR stream may miss the peak frames. That is, the 3 FPS HR stream does not contain the required peak frame. The HR stream may be captured by an electronic device at 3 FPS due to a power constraint and/or a memory constraint.

FIG. 2A shows the peak action frame with low resolution, FIG. 2B shows the closest HR frame which is close to the peak action frame, and FIG. 2C shows the missed HR peak action frame in the 3 FPS HR stream.

Further, related art methods may use operations such as single image super resolution on LR peak action frame resulting in low image quality.

Figure 3A:
FIGS. 3A and 3B are diagrams illustrating a zoom factor which remains unaltered throughout video capture, according to a related art system.
Figure 3B:
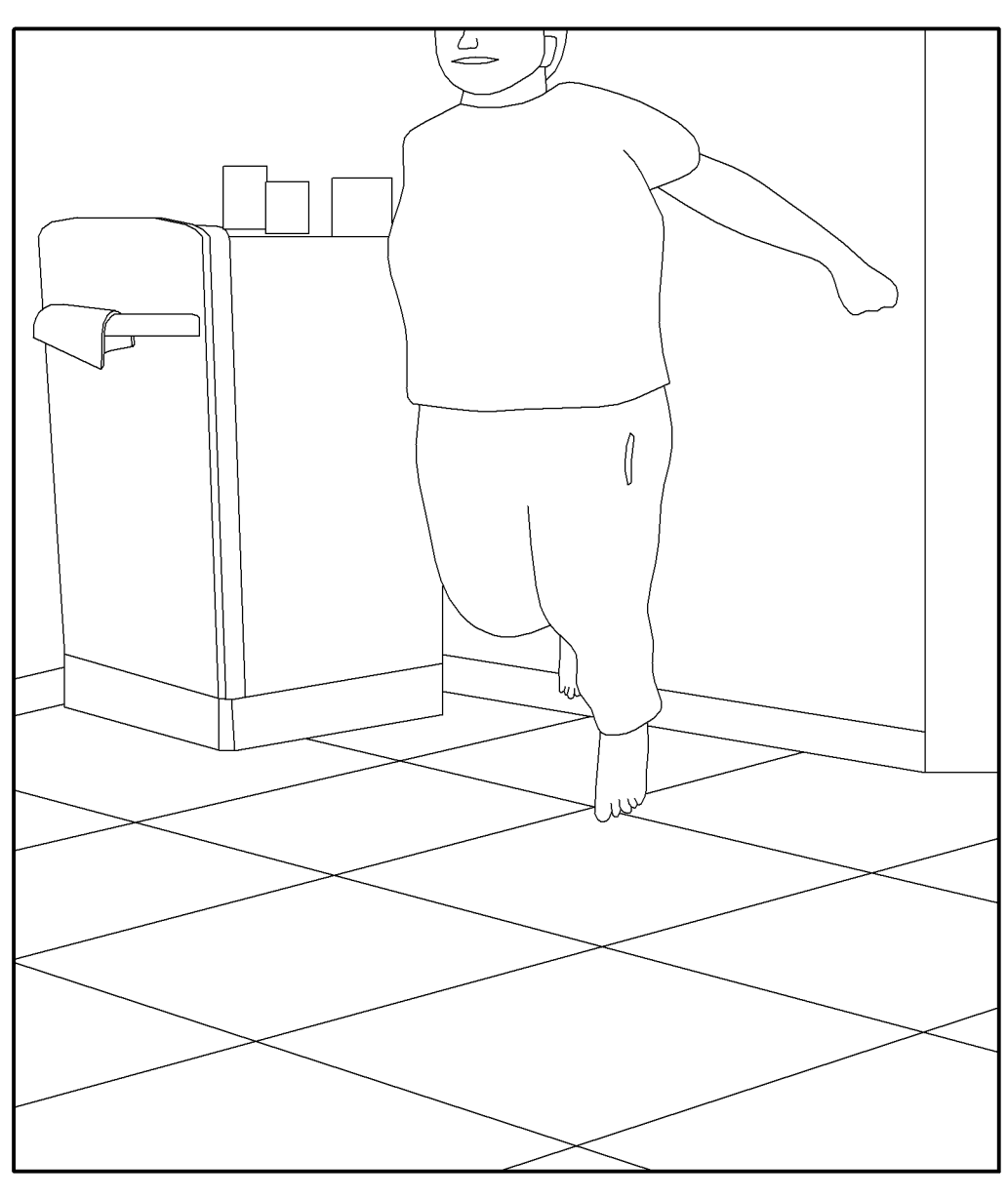

FIGS. 3A and 3B are diagrams illustrating a zoom factor which remains unaltered throughout video capture, according to a related art system.

Referring to FIGS. 3A and 3B, in related art systems, zoom factor remains unaltered throughout video capture, the size of the subject gets smaller when the subject moves away from a camera.

In FIG. 3A, a photo is captured when a subject is about to jump and in FIG. 3B, a photo is captured when the subject is at peak of jump. In the related art image capturing system, since the zoom factor is not altered, the head of the subject is not captured when the subject is at peak of jump.

Figure 4:
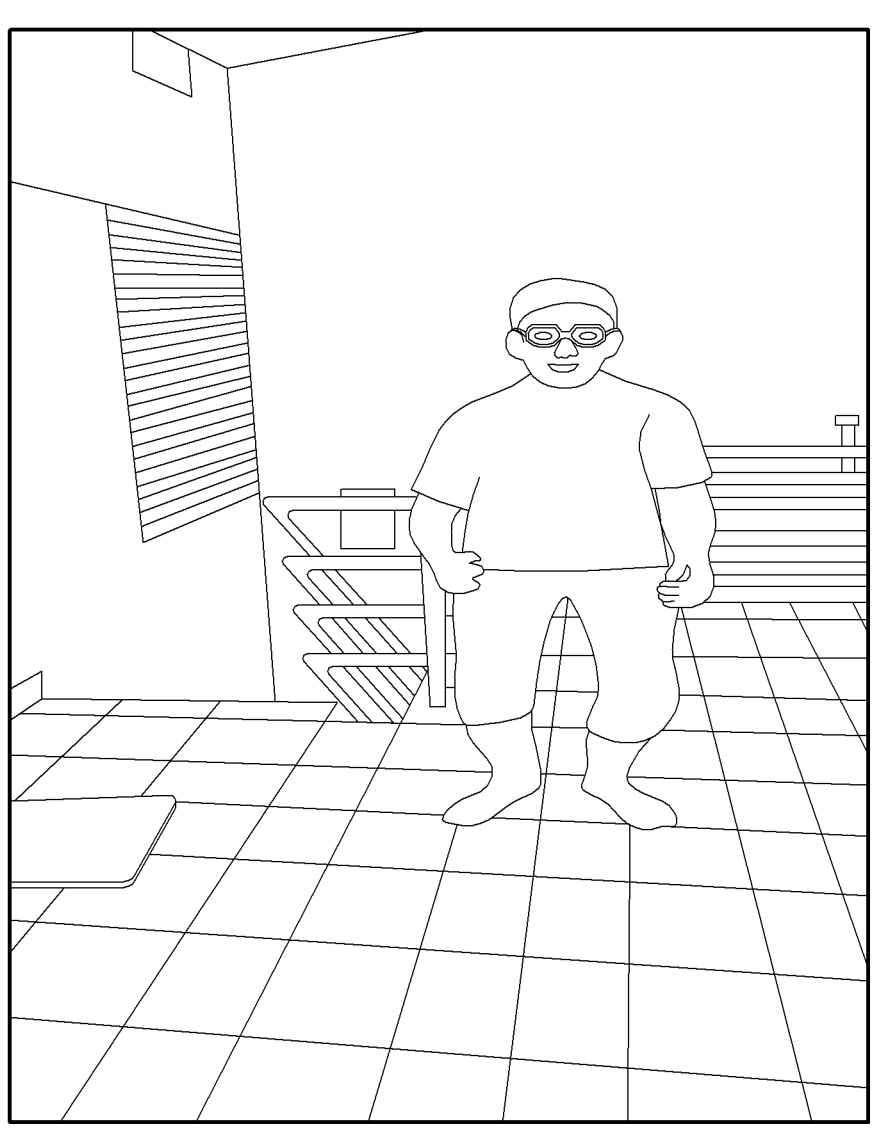
FIG. 4 is a diagram illustrating a video capture without direction cues, according to a related art system.

FIG. 4 is a diagram illustrating a video capture without direction cues, according to a related art system.

Related art system do not provide any direction cues to a user, and as such, there is a chance that important information or desired information may be missed due to slow camera movement by a user. For example, in a case in which, the user capturing a subject fails to move a camera in a timely manner may cutoff a head of the subject since the camera did not move up in time. Specifically, for fast actions, it is difficult to move the camera beforehand by the user, so important or desired information may be missed in video capture.

Although FIGS. 1-4 illustrate examples in which the subject is a human, the disclosure is not limited thereto. As such, according to various embodiments of the disclosure, the subject being captured by a capturing device (e.g., a camera) may including, but is not limited to, a human, an animal (e.g., a pet), a moving objection (e.g., a vehicle), etc.

In the description of FIGS. 5 to 19 provided below, similar reference characters denote corresponding features consistently throughout the figures.

Figure 5:
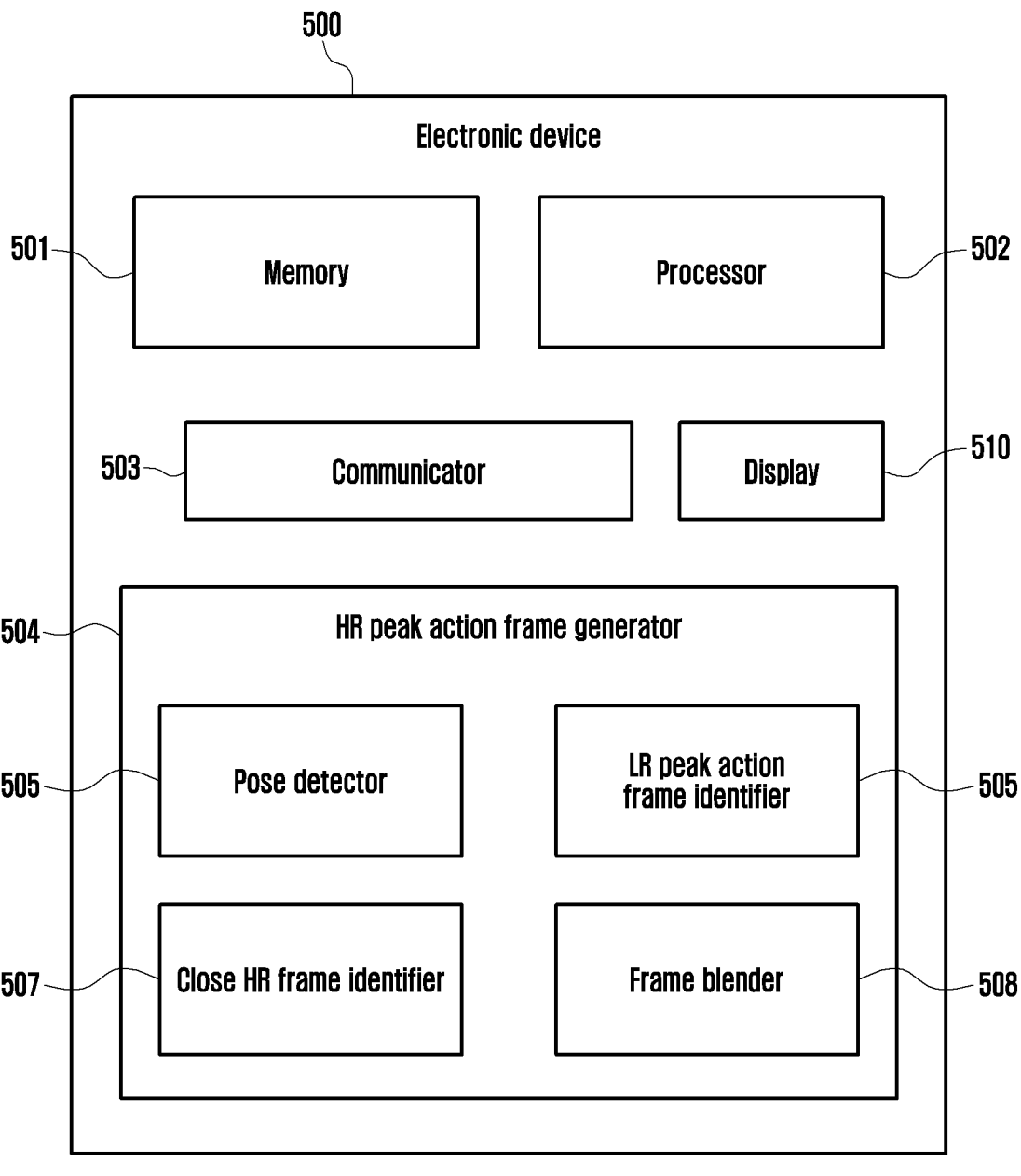
FIG. 5 is a block diagram of an electronic device for generating high resolution peak action frame, according to an embodiment of the disclosure.

FIG. 5 is a block diagram of an electronic device for generating high resolution peak action frame, according to an embodiment of the disclosure. The electronic device may be a laptop, a palmtop, a desktop, a mobile phone, a smartphone, Personal Digital Assistant (PDA), a tablet, a wearable device, an Internet of Things (IoT) device, a virtual reality device, a foldable device, a flexible device, an immersive system, etc. However, the disclosure is not limited thereto, and as such, the electronic device may include other devices.

Referring to FIG. 5, the electronic device (500) may include a display (510), a memory (501), a processor (502), a communicator (503), and a HR peak action frame generator (504).

The memory (501) may store instructions to be executed by the processor (502). The memory (501) may include non-volatile storage elements. Examples of such non-volatile storage elements may include, but is not limited to, magnetic hard discs, optical discs, floppy discs, flash memories, or forms of electrically programmable memories (EPROM) or electrically erasable and programmable (EEPROM) memories. In addition, the memory (501) may, in some examples, be considered a non-transitory storage medium. The term "non-transitory" may indicate that the storage medium is not embodied in a carrier wave or a propagated signal. However, the term "non-transitory" should not be interpreted that the memory (501) is non-movable. In some examples, the memory (501) can be configured to store larger amounts of information than its storage space. In certain examples, a non-transitory storage medium may store data that can, over time, change (e.g., in Random Access Memory (RAM) or cache). The memory (501) can be an internal storage unit or it can be an external storage unit of the electronic device (500), a cloud storage, or any other type of external storage.

The processor (502) may be configured to execute instructions stored in the memory (501). The processor (502) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (502) may include a single core or multiple cores to execute the instructions. However, the processor (502) of the disclosure is not limited to the examples provided above.

The communicator (503) may be configured to communicate internally between hardware components in the electronic devices. However, the disclosure is not limited thereto, and as such, the communicator (503) may be configured to communicate externally to another electronic device, such as another user equipment or a server. Further, the communicator (503) may be configured to facilitate the communication between the electronic device (500) and other devices via one or more networks. For example, the one or more networks may include radio technology or other types of networks used for communicating between devices. The communicator (503) may include an electronic circuit specific to a standard that enables wired or wireless communication.

The HR peak action frame generator (504) may be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. According to an embodiment, the HR peak action frame generator (504) may be implemented as a separate component from the processor (502). However, the disclosure is not limited thereto, and as such, according to another embodiment, some or all of the components of the HR peak action frame generator (504) may be implemented in the processor (502).

The HR peak action frame generator (504) may include a pose detector (505), a LR peak action frame identifier (505), a close HR frame identifier (507) and a frame blender (508).

The HR peak action frame generator (504) may be configured to receive a low resolution (LR) image stream with high frame speed and a high resolution (HR) image stream with low frame speed. The pose detector (505) may detect at least one pose of at least one subject in the LR image stream. The at least one pose may be a predefined pose and/or the at least one subject may be a human. The LR peak action frame identifier (505) may be configured to determine a LR peak action frame in the LR image stream based on the at least one pose. The close HR frame identifier (507) may be configured to identify a close HR frame from the HR image stream, which is closest to the LR peak action frame, and to fetch the close HR frame from the HR image stream closest to the determined LR peak action frame. The frame blender (508) may be configured to generate a HR peak action frame by blending the identified HR frame and the LR peak action frame.

According to an embodiment, the HR peak action frame generator may be configured to receive the LR image stream with high frame speed and analyze the LR image stream with a deep neural network (DNN). The HR peak action frame generator may be further configured to detect the pose. The pose may indicate the beginning of the action by the human using the DNN.

According to an embodiment, the HR peak action frame generator may be configured to initiate a video recording by a LR capture of a scene having at least one human and detect at least one pose of the human subject in the scene. The pose may indicate a beginning of an action by the human. The HR peak action frame generator may be further configured to initiate or trigger an Artificial Intelligence (AI) module to track the path of action of the human and initiate or start a HR capture of the scene. The start of HR capture of the scene may be in parallel to the initiation or the triggering of the AI module. For example, the start of the HR capture of the scene and the initiation or the triggering of the AI module may be simultaneous. The HR peak action frame generator may be further configured to fetch at least two candidate frames closer to a peak of action of the human from the LR image stream using the AI module and determine a LR peak action frame containing the peak of action of the human subject from among the candidate frames. The HR peak action frame generator may be further configured to identify the close HR frame which is closest to the determined LR peak action frame from the HR image stream.

According to an embodiment, the HR peak action frame generator may be configured to generate at least one key point of the human using the DNN and detect an action recoil cues by matching optical flow of the at least one key point of the human with a pattern during the movement of the human. The HR peak action frame generator may be further configured to identify at least one of velocity and angle of action of the human based on the movement of the at least one key point based on the detection of action recoil cues and predict time and location of the peak action of the human based on the identified at least one of velocity and angle of action of the human. The HR peak action frame generator may be further configured to determine a LR peak action frame based on the prediction and a number of LR frame capture per second.

According to an embodiment, the HR peak action frame generator may be configured to receive the HR image stream with low frame speed and receive the determined LR peak action frame. The HR peak action frame generator may be further configured to update an offset of the HR image stream based on the determined LR peak action frame. The HR peak action frame generator may be further configured to identify the close HR frame, which is closest to the determined LR peak action frame from the updated HR image stream.

According to an embodiment, the HR image stream may be an RGB image captured by at least one of an imaging apparatus with limited spectral resolution.

According to an embodiment, the HR peak action frame generator may be configured to identify the close HR frame from the HR image stream, which is closest to the LR peak action frame, using the action recoil cues and align the close HR frame with the LR peak action frame. The close HR frame may be geometrically and/or photometrically aligned with the LR peak action frame. The HR peak action frame generator may be further configured to compute a motion map by estimating motion differences between the aligned close HR frame and the LR peak action frame and blend the aligned close HR frame and the LR peak action frame using the computed motion map. The HR peak action frame generator may be further configured to generate the HR peak action frame with high resolution components in a background and one or more peak action regions.

According to an embodiment, the HR peak action frame generator may be configured to receive an image stream with low frame speed and detect an action recoil cues based on the movement of the human. The HR peak action frame generator may be further configured to predict an arrival time of a peak action frame based on the detected action recoil cues and determining a slow motion start time and end time based on at least one of the arrival time of the peak action frame, slow motion buffer size and target high frame speed. The HR peak action frame generator may be further configured to modify a frame rate of the received image stream to the target high frame speed and generate a slow motion video segment for the determined slow motion start time and end time in accordance with the modified frame rate.

According to an embodiment, HR peak action frame generator may be configured to receive an image stream and detect an action recoil cues based on the movement of the human. The HR peak action frame generator may be further configured to adjust a zoom factor based on the detected action recoil cues.

According to an embodiment, the HR peak action frame generator may be configured to receive an image stream and detect an action recoil cues based on the movement of the human. The HR peak action frame generator may be further configured to identify at least one of velocity and angle of action of the human based on the movement based on the action recoil cues and predict time and location of the peak action of the human based on the identified at least one of velocity and angle of action of the human. The HR peak action frame generator may be further configured to display direction cues to a user to move a camera for capturing based on the prediction.

The display (510) may output or display the close HR frame from the HR image stream, which is closest to the determined LR peak action frame. For example, the electronic device may output or display the close HR frame from the HR image stream, which is closest to the determined LR peak action frame. The display (510) may output or display the HR peak action frame by blending the identified HR frame and the LR peak action frame.

FIG. 6 is a flow diagram (600) illustrating a method for generating high resolution peak action frame, according to an embodiment of the disclosure.

According to an embodiment, in operation 602, the method may include receiving a low resolution (LR) image stream with high frame speed and a high resolution (HR) image stream with low frame speed. For example, the electronic device may receive a low resolution (LR) image stream with high frame speed and a high resolution (HR) image stream with low frame speed.

In operation 604, the method may include detecting at least one pose of at least one human in the LR image stream. For example, the electronic device may detect at least one pose of at least one human in the LR image stream. The detected at least one pose may be a predefined or a predetermined pose of at least one human in the LR image stream. For example, the detected at least one pose may be a pose having a particular attribute or characteristic.

In operation 606, the method may include obtaining a LR peak action frame in the LR image stream based on the at least one pose. For example, the electronic device may obtain a LR peak action frame in the LR image stream based on the at least one pose.

In operation 608, the method may include identifying a close HR frame from the HR image stream, which is closest to the LR peak action frame. For example, the electronic device may identify a close HR frame from the HR image stream, which is closest to the LR peak action frame.

In operation 609, the method may include fetching the close HR frame from the HR image stream, which is closest to the determined LR peak action frame. For example, the electronic device may fetch the close HR frame from the HR image stream, which is closest to the determined LR peak action frame. In operation 609, the method may include outputting or displaying the close HR frame from the HR image stream, which is closest to the determined LR peak action frame. For example, the electronic device may output or display the close HR frame from the HR image stream, which is closest to the determined LR peak action frame.

In operation 610, the method may include generating a HR peak action frame by blending the identified HR frame and the LR peak action frame. For example, the electronic device may generate a HR peak action frame by blending the identified HR frame and the LR peak action frame. In operation 610, the method may include outputting or displaying the HR peak action frame by blending the identified HR frame and the LR peak action frame.

The various actions, acts, blocks, operations, steps, or the like in the method may be performed in the order presented, in a different order or simultaneously. Further, in some embodiments, some of the actions, acts, blocks, operations, steps, or the like may be omitted, added, modified, skipped, or the like without departing from the scope of the invention.

Figure 7:
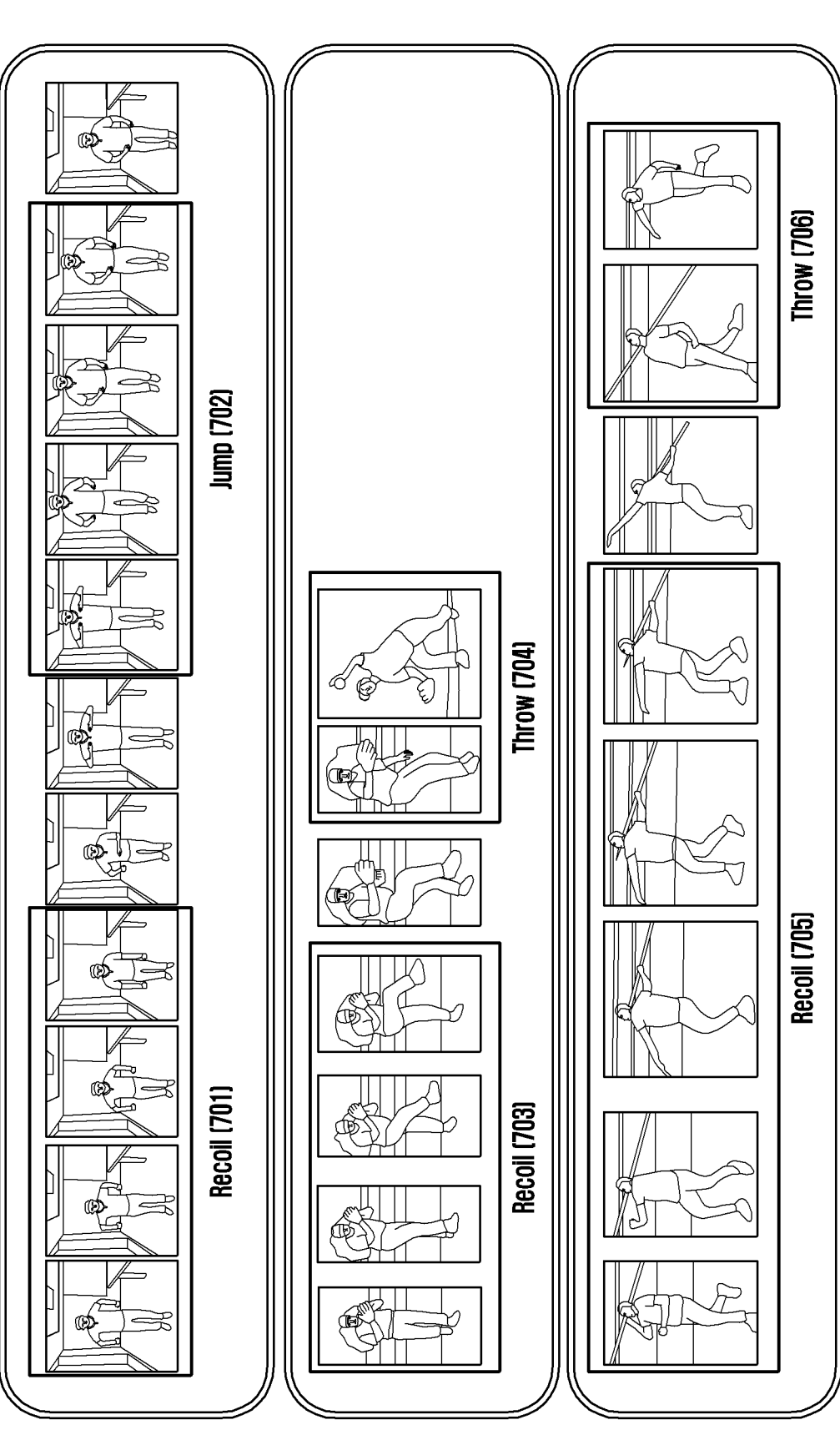
FIG. 7 is a diagram illustrating an action recoil, according to an embodiment of the disclosure.

FIG. 7 is a diagram illustrating an action recoil, according to an embodiment of the disclosure.

According to Newton's third law of motion, every action has an equal and opposite reaction. Similarly, to perform any action, an initial sequence of actions has to be performed to gather the necessary momentum required and this initial sequence of actions is called as recoil.

For example, in a jump sequence, a person goes down (701) to generate the force required for the jump (702), the person takes his hand behind (703) to generate the force required for the throw the ball (704), the person takes his hand behind (705) to generate the force required to throw the javelin (706).

Based on the initial sequence of actions (e.g., recoil 701, 703 or 705), the approximate position of the peak can be obtained. According to an example embodiment, the obtained information is used to capture HR frame for the peak instant.

Figure 8:
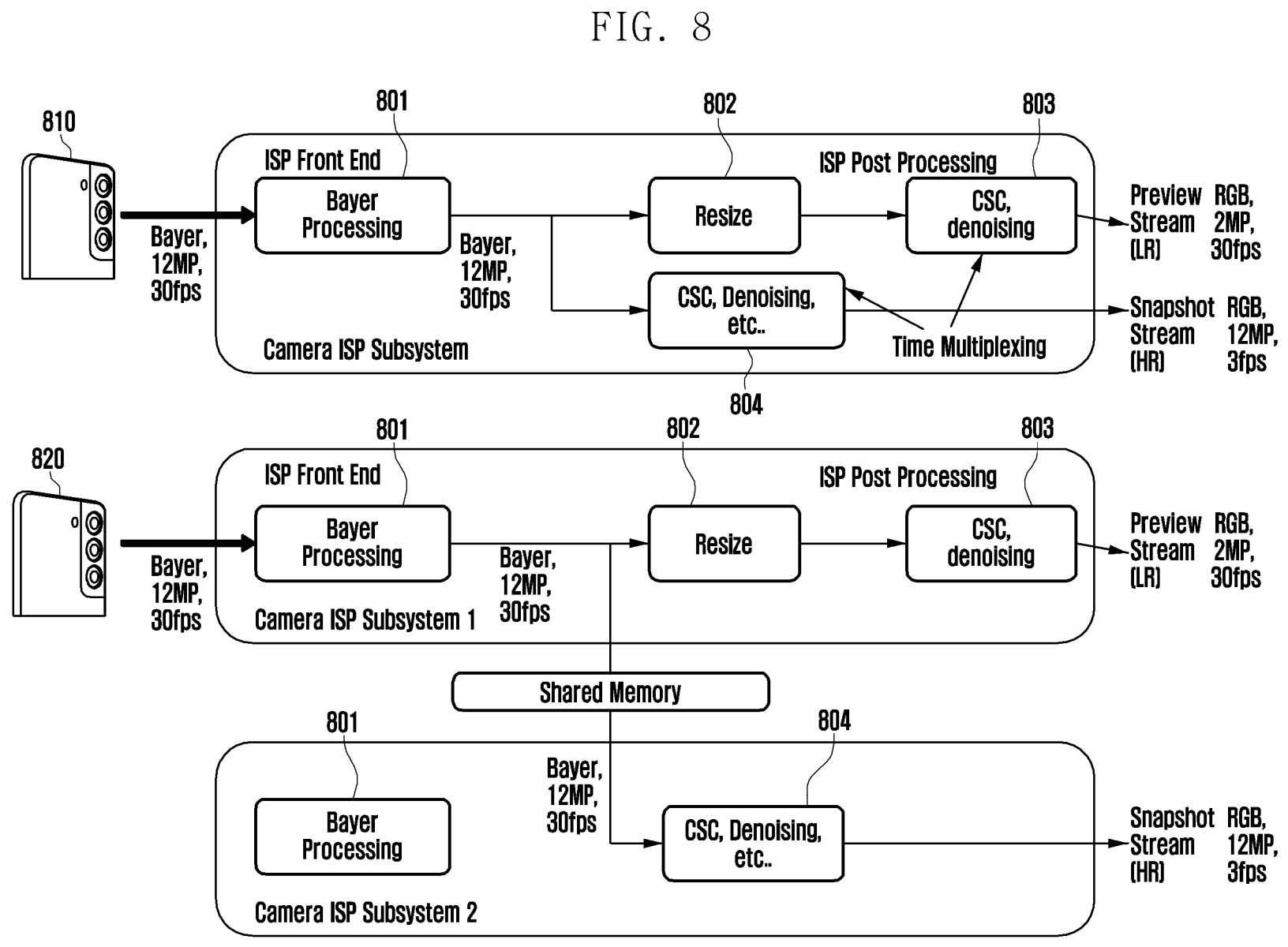

FIG. 8 is a schematic diagram illustrating usability and scalability of multiple Image Signal Processor, according to an embodiment of the disclosure;

FIG. 8 illustrates the usability and scalability of multiple Image Signal Processor (ISP). In option 1 (810), an electronic device according to an embodiment may include using ISP1 for LR stream and HR stream. In option 2 (820), the electronic device according to an embodiment may include using ISP 1 for LR stream and the ISP 2 for HR stream.

The camera ISP, ISP 1 and ISP 2 may include components including, but not limited to, Bayer processing modules (801) such as Bayer noise removal, sharpness enhancement, color correction, etc. The Bayer processing may be provided at the front end of the ISP. Moreover, the camera ISP, ISP 1 and ISP 2 may include post processing modules including, but not limited to, color space conversion, denoising (804), cropping, scaling (802), rotation, multi-frame processing. The post processing modules are shared between LR and HR stream in a time multiplexed way in the option 1 (810). On the other hand, the post processing modules are not shared between LR and HR stream in a time multiplexed way in the option 2 (820). However, the post processing modules may have a shared memory.

Figure 9:
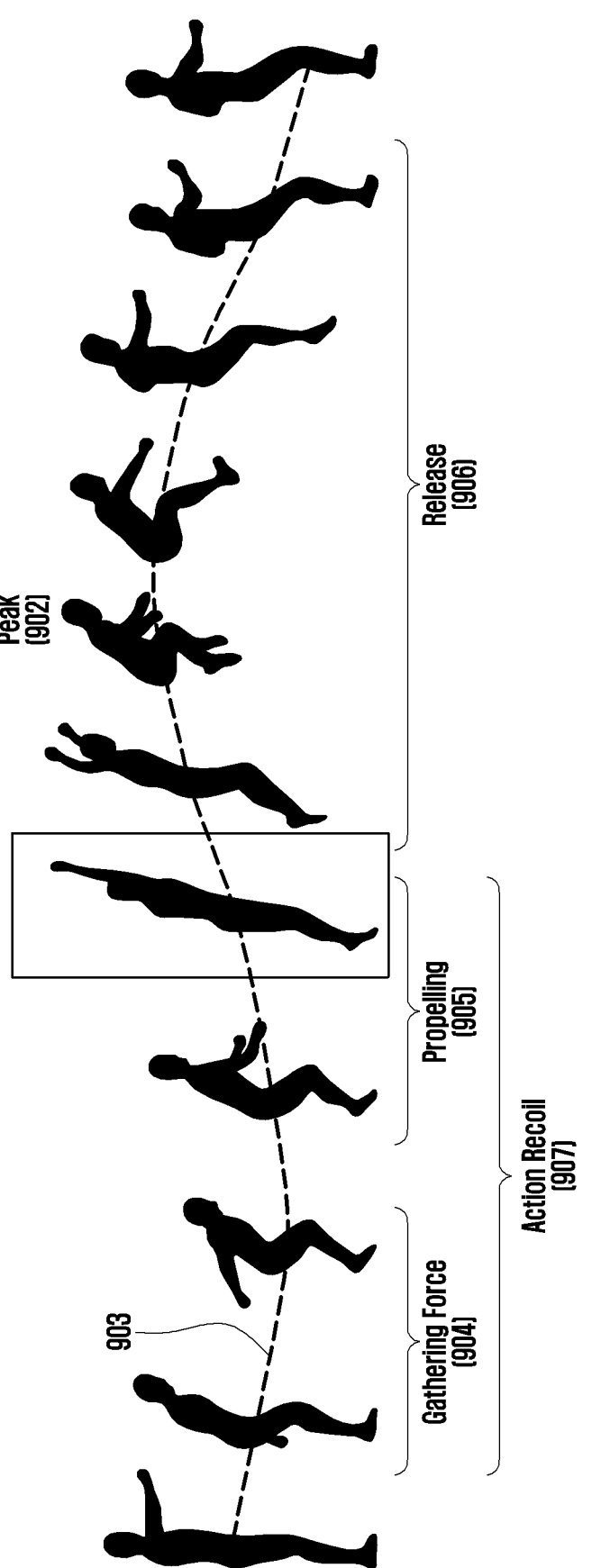
FIG. 9 is a diagram illustrating an action recoil analysis, according to an embodiment of the disclosure.

FIG. 9 is a diagram illustrating an action recoil analysis, according to an embodiment of the disclosure.

For example, an action typically includes of three sequences: gathering force (904), propelling (905) and release (906). For example, in a jump action, the user first goes down to gather force (904), then propels upward (905), and finally releases (906) from the ground to jump. The first two sequences gather force (904) and propel (905) is the recoil (907).

Initially, gathering force phase (904) of the recoil (907) may be detected using optical flow on initial human key points. Thereafter, the key point movement during propelling (905) phase may be analyzed based on initial velocity (v) and angle of release (θ). The peak time (t) and peak location (902) of the action may be computed using a projectile motion equation. The required offset to HR stream may be computed from the peak time. The line indicated the trajectory of key points (903).

The projectile motion equation is $$t = v\frac{\sin\theta}{g},$$

wherein g is acceleration of gravity.

Figure 10:
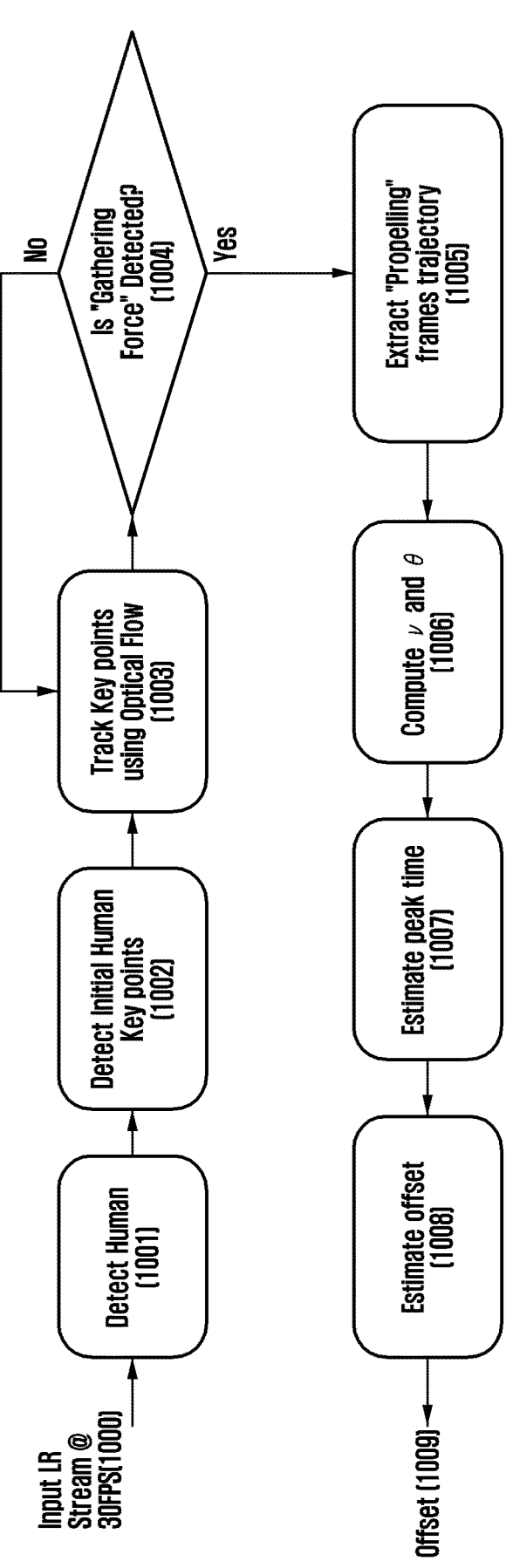
FIG. 10 is a flow diagram illustrating an offset computation in recoil analysis, according to an embodiment of the disclosure.

FIG. 10 is a flow diagram (1010) illustrating an offset computation in recoil analysis, according to an embodiment of the disclosure.

According to an embodiment, in operation 1000, the method may include receiving or capturing an input LR stream at the high FPS. For example, the electronic device receives or captures an input LR stream at the high FPS.

In operation (1001), the method may include detecting human in the input LR stream, and, in operation (1002), the method may include detecting the initial human key points in operation. For example, the electronic device detects human in the input LR stream and detect the initial human key points.

In operation (1003), the method may include tracking the human key points using optical flow. For example, the electronic device tracks the human key points using optical flow.

In operation (1004), the method may include checking whether the gathering force is detected or not. For example, the electronic device checks whether the gathering force is detected or not. In a case in which the gathering force is not detected, the electronic device will again track the key points using the optical flow. In a case in which the gathering force is detected, in operation 1005, the method may include extracting propelling frames trajectory. For example, the electronic device extracts propelling frames trajectory based on the gathering force being detected.

In operation (1006), the method may include obtaining the velocity (v) and angle of release (θ) based on the propelling frames trajectory. For example, the electronic device obtains the velocity (v) and angle of release (θ) based on the propelling frames trajectory. For example, the initial velocity may be calculated using the displacement of key points and number of frame during propelling and initial angle is calculated using the slope of the trajectory at the last frame in propelling.

In operation (1007), the method may include estimating the peak time of the action based on a projectile motion equation. For example, the electronic device estimates the peak time of the action using a projectile motion equation.

In operation (1008), the method may include estimating the required offset to HR stream from the peak time, and in operation (1009), the method may include applying the offset in the HR stream. For example, the electronic device estimates the required offset to HR stream from the peak time and applies the offset in the HR stream.

Figure 11:
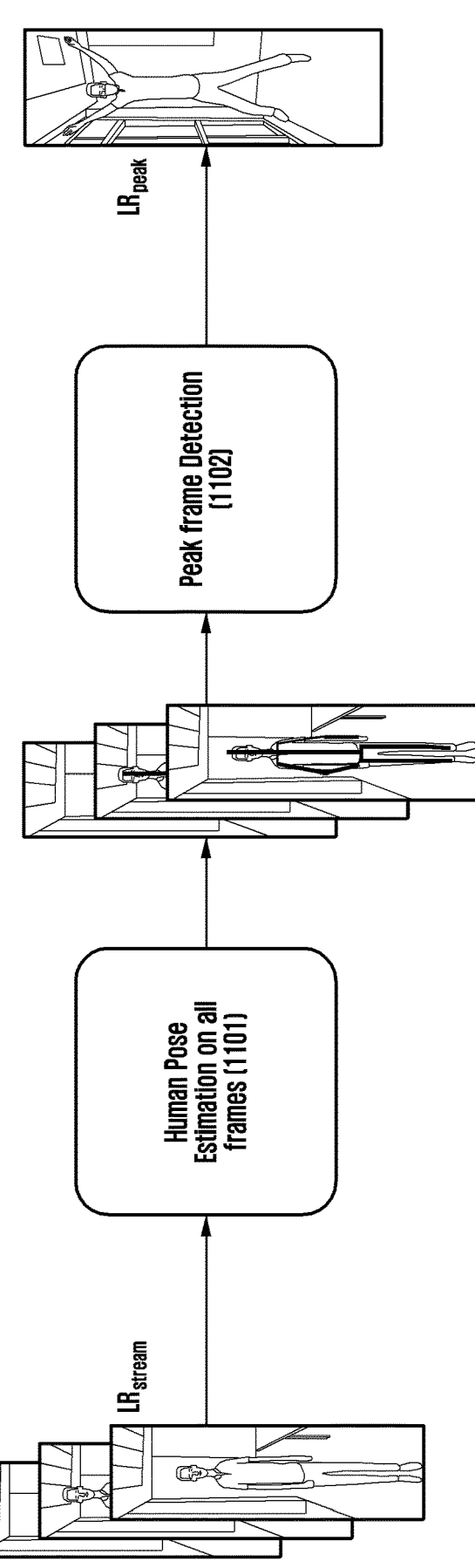
FIG. 11 is a schematic diagram illustrating a low resolution peak frame detection, according to an embodiment of the disclosure.

The various actions, acts, blocks, operations, steps, or the like in the method may be performed in the order presented, in a different order or simultaneously. Further, in some embodiments, some of the actions, acts, blocks, operations, steps, or the like may be omitted, added, modified, skipped, or the like without departing from the scope of the invention FIG. 11 is a diagram illustrating a low resolution peak frame detection, according to an embodiment of the disclosure.

According to an embodiment, in order to obtain the actual peak frame from the low resolution stream, a Deep Neural Network (DNN) may be used over the low resolution high frame rate stream as a post-processing operation after the action is completed. The electronic device may obtain the key points (1101) of the person from the DNN and analyze the key points relative to the frames to get the peak action frame (1102).

The LR peak frame can be specific to the actions. For example, for a jump action, the electronic device may capture the peak frame when the ankle key points are at their highest point. For example, for a throw action, the electronic device may capture the peak frame when the wrist key point is farthest away from the body.

Figure 12:
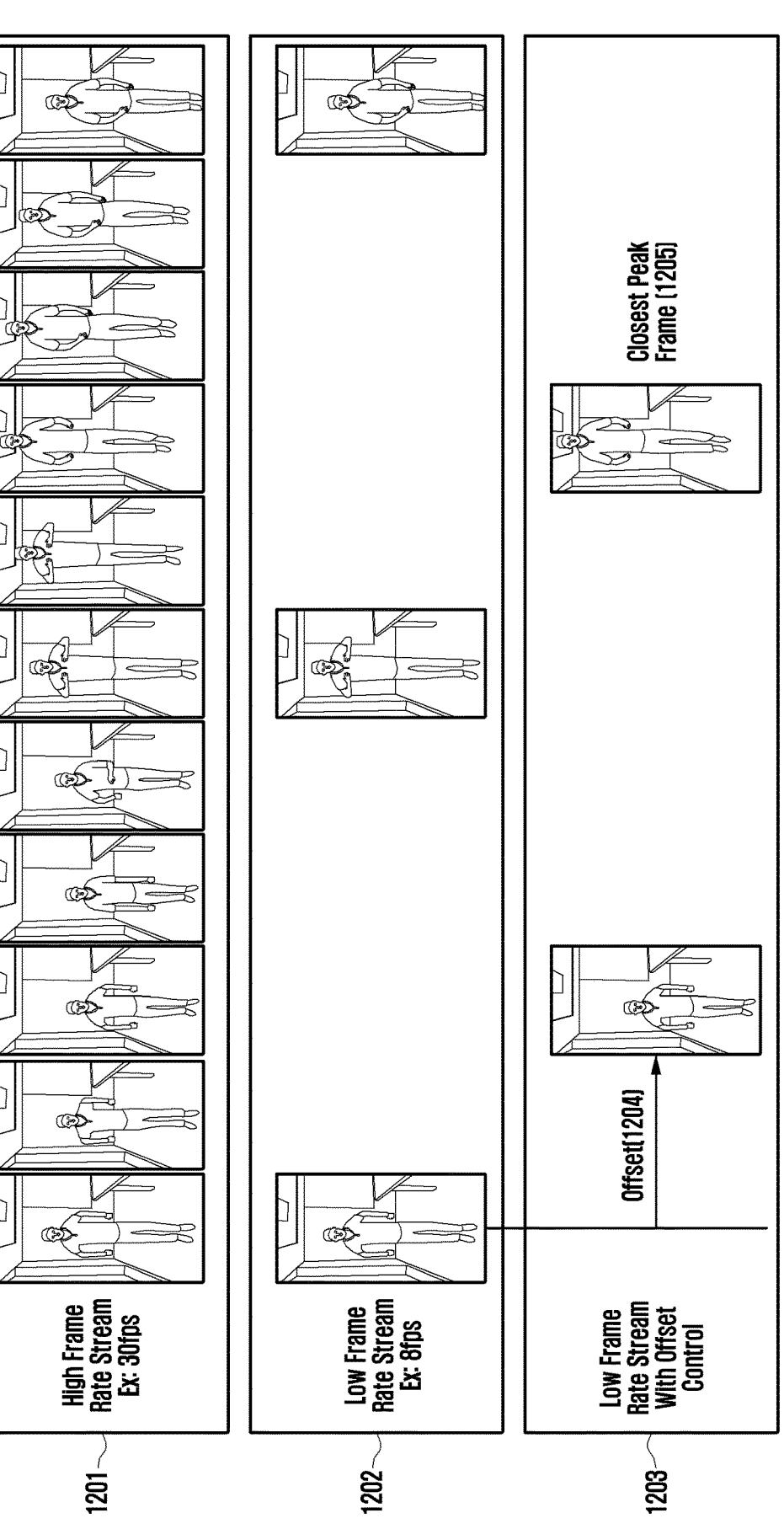
FIG. 12 is a diagram illustrating an offset correction, according to an embodiment of the disclosure.

FIG. 12 is a diagram illustrating an offset correction, according to an embodiment of the disclosure.

In FIG. 12, the sequence of actions (1201) shows the high frame rate streams, for example, 30 FPS. The sequence of actions (1202) is a high resolution stream for which the frame rate is low for example 8 FPS. The sequence of actions (1203) shows the low frame rate streams with offset control (1204) to obtain the closest peak action frame (1205).

As the human actions are typically very fast, hence a low frame rate stream may miss some actions completely. The low frame rate stream has frames at equal intervals such as 0, t, 2t, 3t, 4t . . . wherein "t"=1000/frame rate. According to an embodiment, based on the peak frame prediction, offset correction is applied to change the intervals to 0, t, t+x, 2t+x, 3t+x . . . wherein x is the calculated offset.

Figure 13:
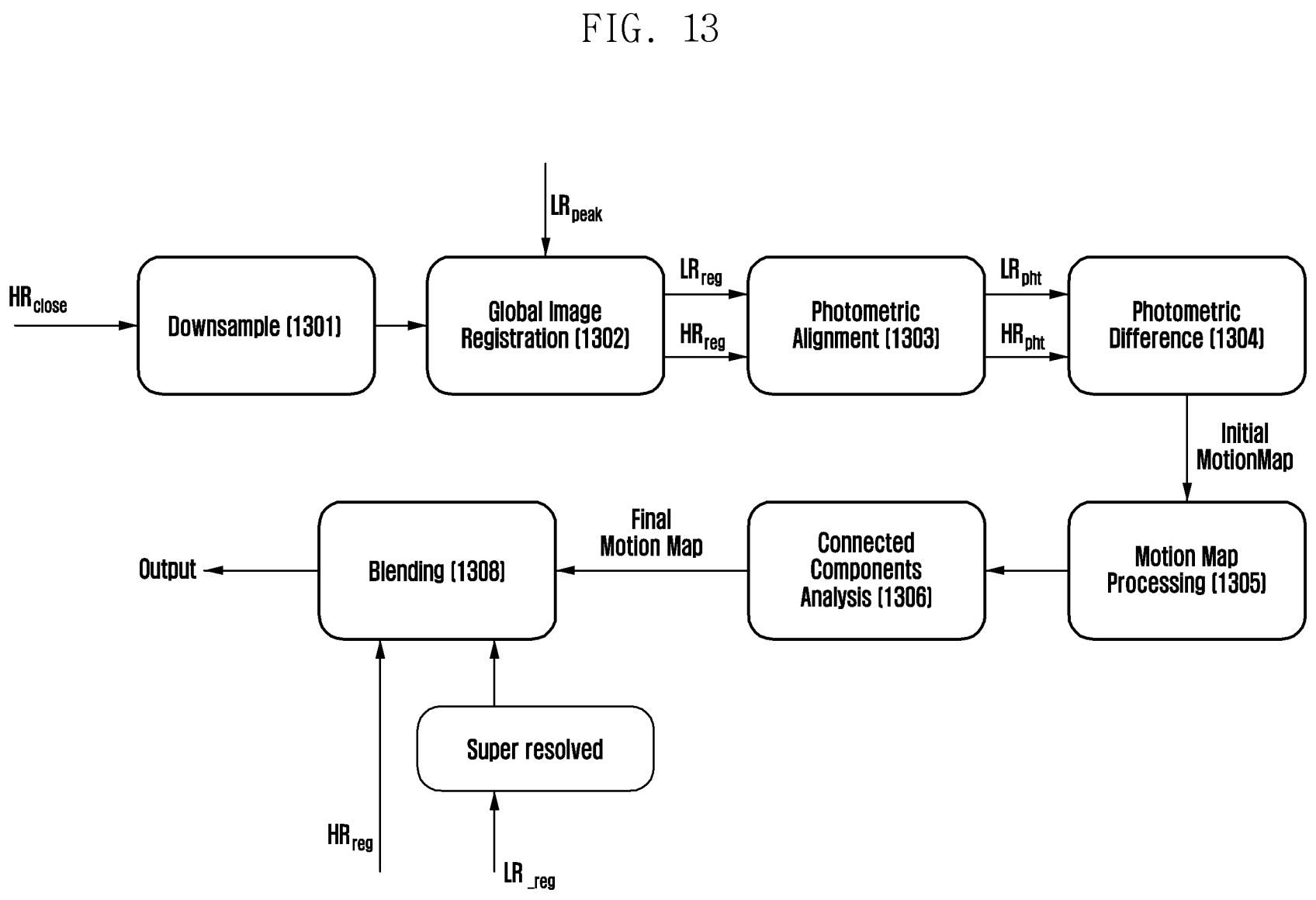

FIG. 13 is a flow chart illustrating a motion compensated blending, according to an embodiment of the disclosure.

In operation 1301, the method may include downsampling a HR close frame, which is closer to the peak action frame. For example, the electronic device may down sample a HR close frame which is closer to the peak action frame.

In operation 1302, the method may include receiving a LR peak action frame and the down sampled HR close frame. For example, during a global image registration, the electronic device receives the LR peak action frame and the down sampled HR close frame. The electronic device may register LR image and HR image based on the LR peak action frame and the down sampled HR close frame. For example, the LR image and the HR image may be geometrically and photometrically registered. The electronic device may output registered LR image and registered HR image.

In operation 1303, the method may include analyzing and/or identifying an alignment of the photometric, and operation 1304, the method may include obtaining a photometric difference. For example, the electronic device calculates the alignment of the photometric and the photometric difference.

In operation 1305, the method may include obtaining an initial motion map based on the photometric difference. For example, photometrically registered images are used by the electronic device to compute an initial motion map based on the photometric difference. The motion map is processing using thresholding and morphological operations.

In operation (1306), the method may include performing connected component analysis to the resultant motion map and smaller components are removed. For example, the electronic device performs connected component analysis to the resultant motion map and removes smaller components.

In operation (1308), the method may include blending original HR image and super resolved LR image. For example, the electronic device uses laplacian pyramid blending to blend original HR image and super resolved LR image. The output image of operation 1308 will have high resolution components in the background, and super resolved peak action regions.

Figure 14:
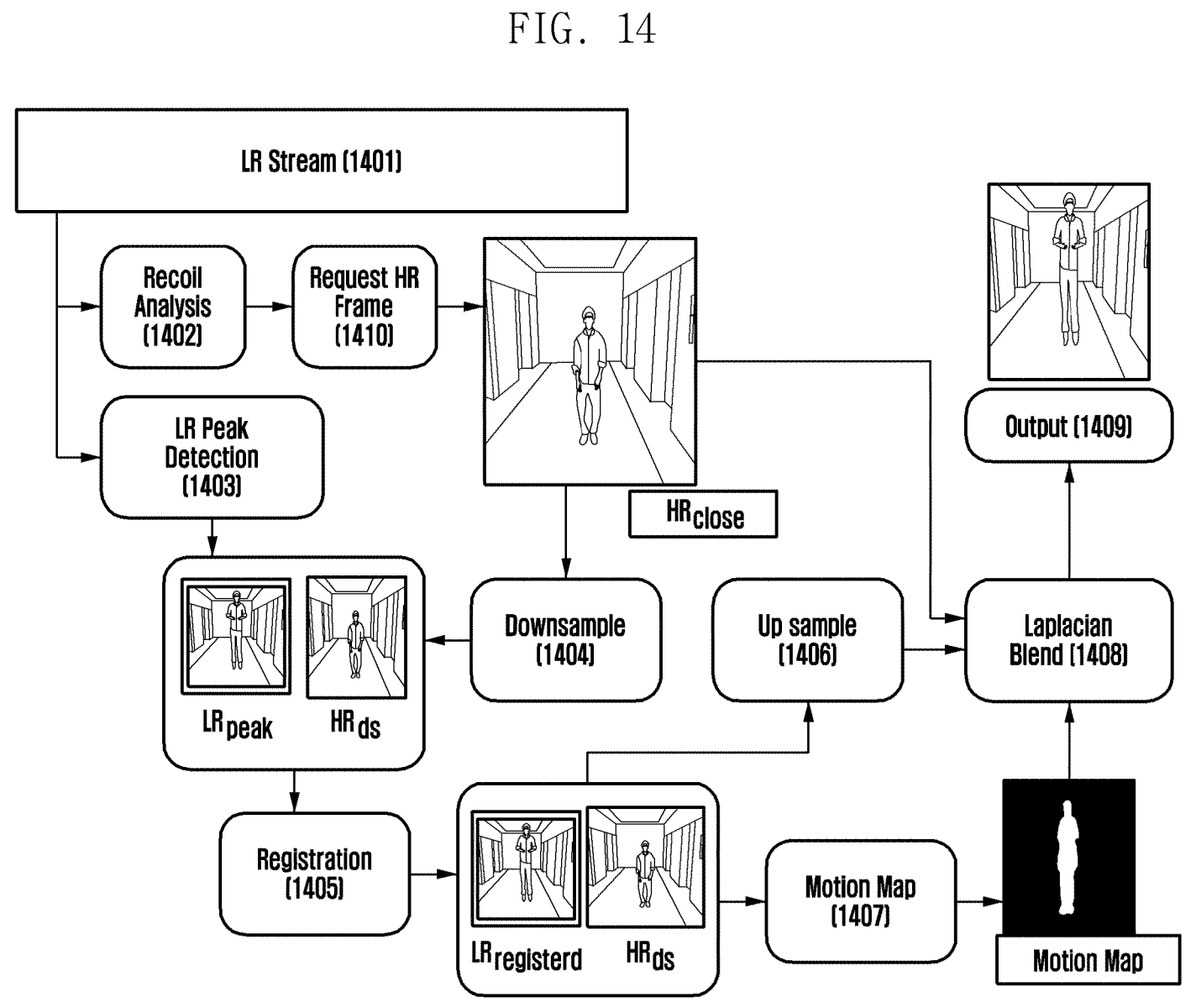

The various actions, acts, blocks, operations, steps, or the like in the method may be performed in the order presented, in a different order or simultaneously. Further, in some embodiments, some of the actions, acts, blocks, operations, steps, or the like may be omitted, added, modified, skipped, or the like without departing from the scope of the invention FIG. 14 is a diagram illustrating a high resolution peak frame for jump actions, according to an embodiment of the disclosure.

The electronic device receives the LR stream (1401) and performs recoil analysis (1402) in the received LR stream to detect the LR peak action (1403). The electronic device also request HR frame (1410) based on the recoil analysis, the received HR frame is down sample (1404).

The electronic device performs registration (1405) of the LR peak and the close HR frame to detect the motion map (1407). The electronic device uses laplacian pyramid blending (1408) to blend original HR image and peak detected LR image to get a HR peak action frame. The electronic device may output (1409) the HR peak action frame by blending the original HR image and peak detected LR image.

Figure 15:
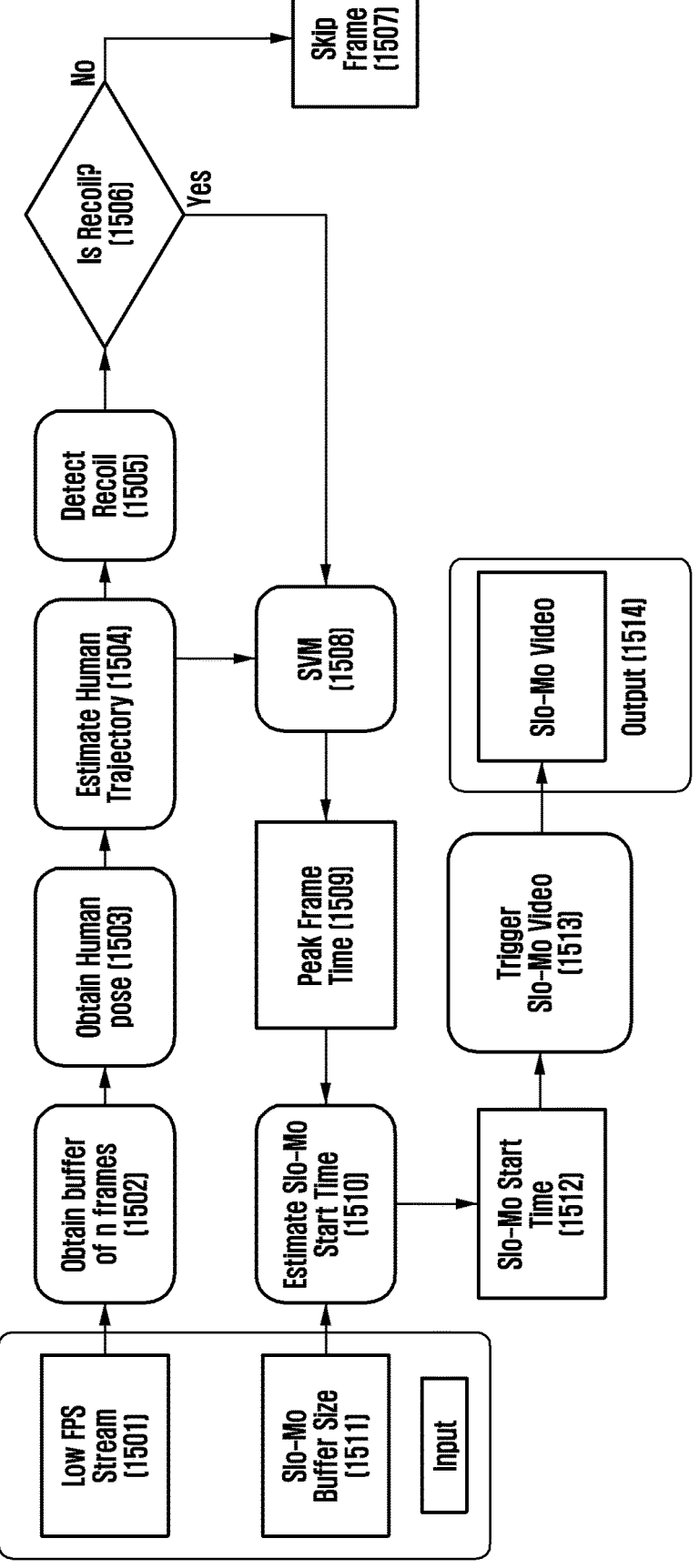
FIG. 15 is a diagram illustrating a super slow motion trigger using action recoil cues, according to an embodiment of the disclosure.

FIG. 15 is a diagram illustrating a super slow motion trigger using action recoil cues, according to an embodiment of the disclosure.

Generally, image buffer for super slow motion (slo-mo) is limited due to memory constraints. Hence, an accurate start and end-frame is required to capture meaningful moments. Related art algorithms detect motion and trigger a super slo-mo, which can lead to inaccuracies since total duration of activity is unknown. On the other hand, according an embodiment of the disclosure, the method predicts start and end frames accurately, and as such, meaningful moments can be captured.

In FIG. 15, the electronic device receives or captures the low FPS stream (1501) as input. The electronic device obtains a buffer of n frames (1502) and obtains human pose (1503) in the low FPS stream. Here, n is an integer. The electronic device estimates the human trajectory (1504) and detects a recoil (1505). The electronic device checks whether recoil is detected or not (1506). In a case in which recoil is not detected, the electronic device skips the frame (1507).

In a case in which recoil is detected, the frames are analyzed by a support vector machine (SVM) (1508) to detect the peak frame time (1509). The electronic devices estimates the slow motion (slo-mo) start time (1510) by using the slo-mo buffer size (1511) and the peak frame time (1509).

The slo-mo start time (1512) is provided to trigger the slo-mo video (1513). The electronic device outputs slo-mo video once triggered based on the slo-mo start time. The determination of slo-mo start time is shown by the below equation.

$$\text{Slo Mo Start Time} = \text{Peak Frame Time} - \frac{\text{Buffer Size}}{2 \times \text{Slo Mo } FPS}$$

Figure 16A:
FIGS. 16A and 16B are diagrams illustrating a zoom factor which changes using recoil cues, according to an embodiment of the disclosure.
Figure 16B:
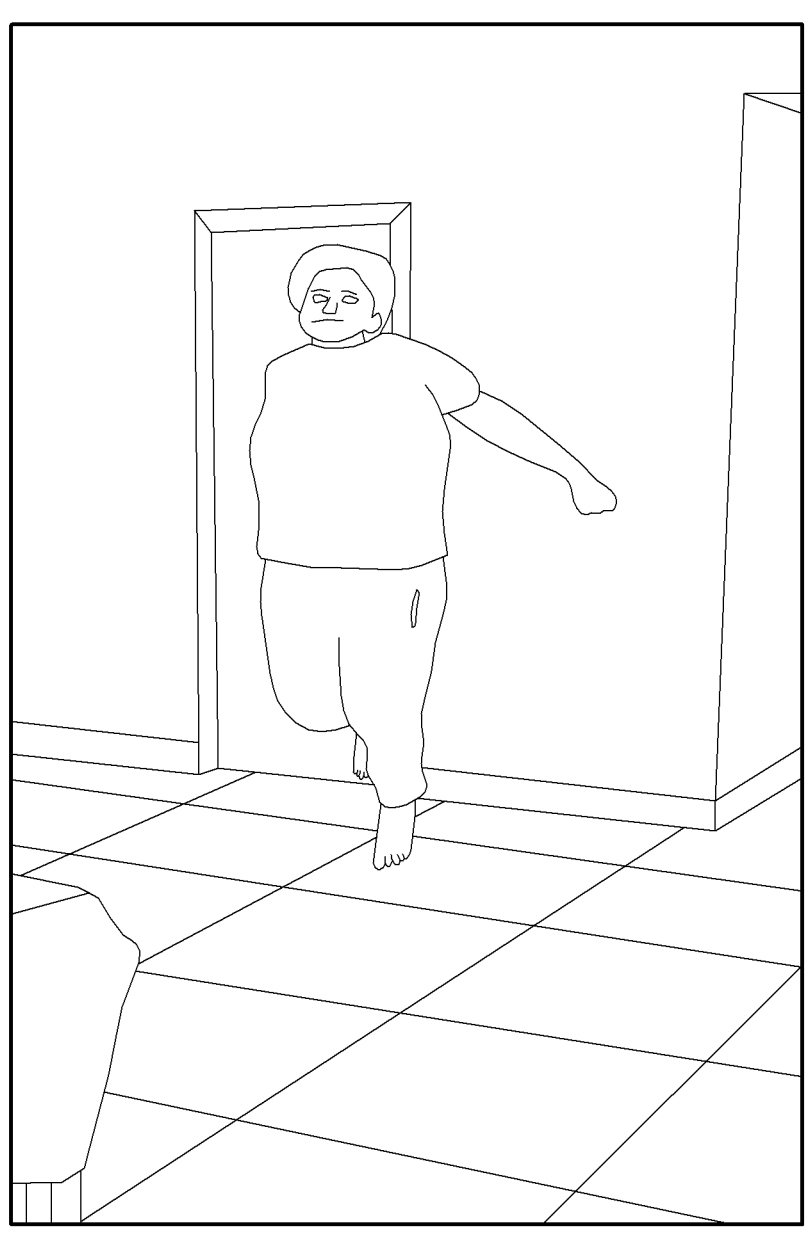

FIGS. 16A and 16B are diagrams illustrating a zoom factor which changes using recoil cues, according to an embodiment of the disclosure.

In FIG. 16A, the user is ready to jump, and the system perform recoil analysis. In FIG. 16B, when the user jumps, the electronic device, according to an embodiment, adaptively changes the zoom factor based on the recoil. The camera switches to tele or wide or ultra-based on zoom factor to capture more information regarding the subject.

Figure 17:
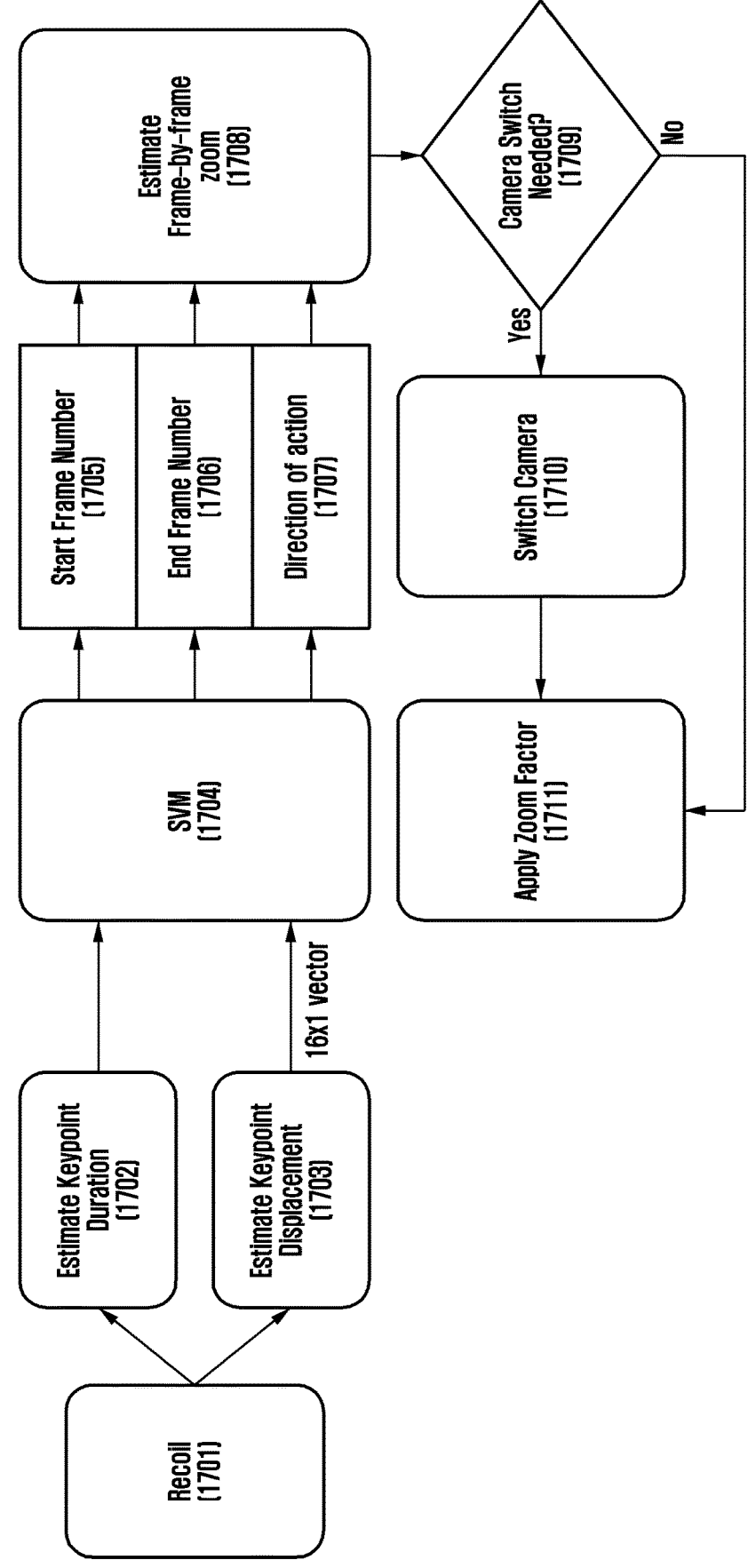
FIG. 17 is a diagram illustrating a zoom factor with recoil cues, according to an embodiment of the disclosure.

FIG. 17 is a diagram illustrating a zoom factor with recoil cues, according to an embodiment of the disclosure.

In operation (1701), the recoil analysis is performed on a frames to provide estimated key point duration (1702) and estimated key point displacement (1703). The provided estimates is input into SVM (1704) to identify the start frame number (1705), end frame number (1706) and direction of action (1707). According to an embodiment, and the identified details, such as the start frame number (1705), end frame number (1706) and direction of action (1707) may be used to estimate frame by frame zoom details (1708). The electronic device determines whether camera switch is required or not (1709) based on the frame by frame zoom details (1708). In a case in which switch camera (1710) is required, the electronic device camera switches to tele mode, wide mode or ultra wide mode based on zoom factor (1711) to capture more information regarding the subject.

Figure 18:
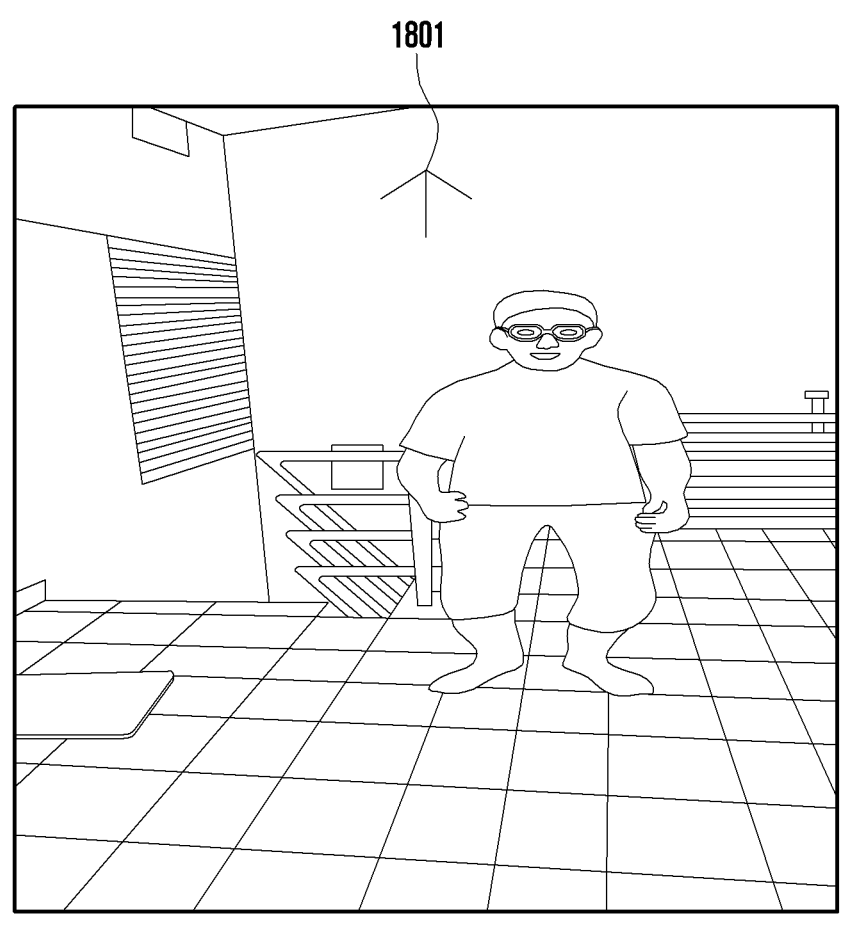
FIG. 18 is a diagram illustrating a video capture with direction cues, according to an embodiment of the disclosure.

FIG. 18 is a diagram illustrating a video capture with one or more direction cues, according to an embodiment of the disclosure.

For example, for fast actions, it is difficult to move the camera beforehand so important information will be missed in video capture. By using action recoil, the electronic device, according to an embodiment, can accurately predict the time and direction of action. Moreover, the electronic device may predict start and end frames accurately, and as such, no meaningful information is lost in capture.

In FIG. 18, cues such as arrow (1801) is provided before the action so that the user has time to move camera. With direction cues, user will be able to move the camera such that no information is lost and the output is desirable.

Figure 19:
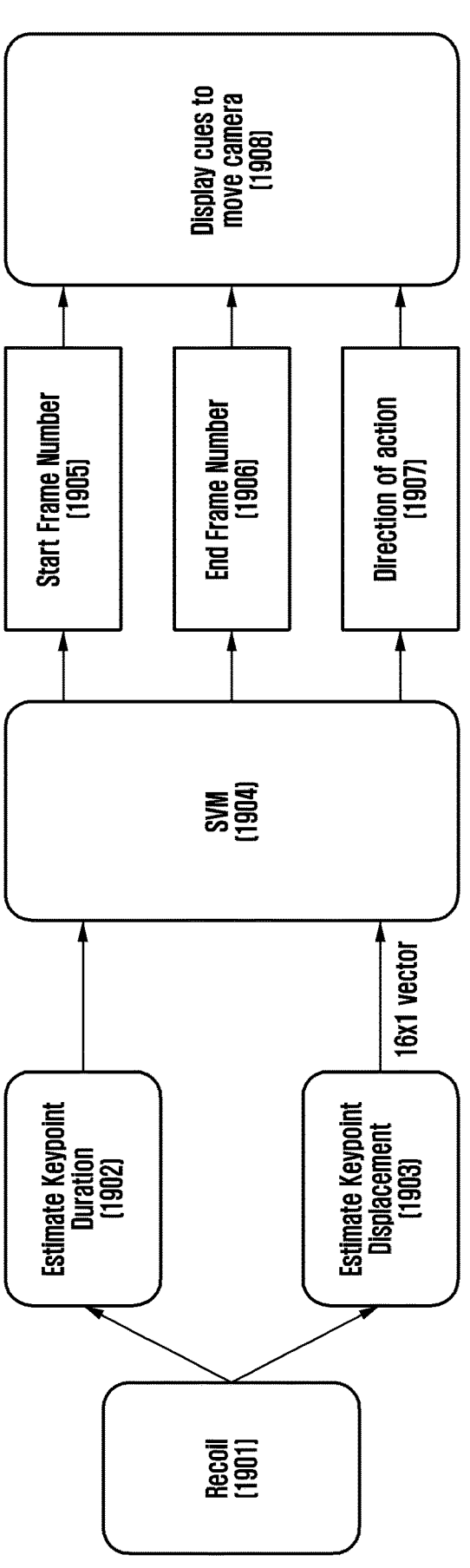
FIG. 19 is a diagram illustrating a camera movement cues based on action prediction, according to an embodiment of the disclosure.

FIG. 19 is a diagram illustrating a camera movement cues based on action prediction, according to an embodiment of the disclosure.

In operation (1901), the recoil analysis is performed on a frames to provide estimated key point duration (1902) and estimated key point displacement (1903). The provided estimates is input into SVM (1904) to identify the start frame number (1905), start frame number (1906) and direction of action (1907).

The identified details, such as the start frame number (1905), start frame number (1906) and direction of action (1907), may be used to display the cues to move camera (1908).

The various actions, acts, blocks, operations, steps, or the like in the method may be performed in the order presented, in a different order or simultaneously. Further, in some embodiments, some of the actions, acts, blocks, operations, steps, or the like may be omitted, added, modified, skipped, or the like without departing from the scope of the invention.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the embodiments of the disclosure. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method comprising:
receiving a low resolution (LR) image stream with a first frame speed and a high resolution (HR) image stream with a second frame speed, the first frame speed being greater than the second frame speed, and the LR image stream having a resolution lower than the HR image stream;
detecting at least one pose of at least one subject in the LR image stream;
obtaining a LR peak action frame in the LR image stream based on the at least one pose;
identifying a first HR frame from the HR image stream, the first HR frame being closest to the LR peak action frame,
wherein the LR peak action frame include a peak of an action of the at least one subject.

2. The method of claim 1, wherein the detecting the at least one pose of the at least one subject in the LR image stream comprises: receiving the LR image stream;
analyzing the LR image stream with a deep neural network (DNN); and
detecting the at least one pose,
wherein the at least one pose indicates a beginning of an action by the at least one subject using the DNN.

3. The method of claim 1, wherein the identifying the first HR frame comprises:
initiating a video recording by a LR capture of a scene having the at least one subject;
detecting the at least one pose of the at least one subject in the scene, the at least one pose indicating a beginning of an action by the at least one subject;
initiating an Artificial Intelligence (AI) module to track a path of the action of the at least one subject;
initiating a HR capture of the scene in parallel to the initiating of the AI module;
fetching at least two candidate frames closer to a peak of the action of the at least one subject from the LR image stream using the AI module;
obtaining the LR peak action frame containing the peak of the action of the at least one subject from among the at least two candidate frames; and
identifying the first HR frame, which is closest to the LR peak action frame, from the HR image stream.

4. The method of claim 1, wherein the obtaining the LR peak action frame comprises:

generating at least one key point of the at least one subject using a deep neural network (DNN);
detecting an action recoil cue by matching optical flow of the at least one key point of the at least one subject with a pattern during a movement of the at least one subject;
identifying at least one of velocity and angle of action of the at least one subject based on the movement of the at least one key point based on the action recoil cue;
predicting time and location of a peak action of the at least one subject based on the identified at least one of velocity and angle of action of the at least one subject; and
obtaining the LR peak action frame based on the predicted time and location of the peak action and a number of LR frame capture per second.

5. The method of claim 1, wherein the identifying the first HR frame comprises:
receiving the HR image stream;
receiving the LR peak action frame;
updating an offset of the HR image stream based on the LR peak action frame; and
identifying the first HR frame that is closest to the LR peak action frame from the updated HR image stream.

6. The method of claim 4, wherein the generating the HR peak action frame comprises:
identifying the first HR frame from the HR image stream which is closest to the LR peak action frame using the action recoil cue;
aligning the first HR frame at least one of geometrically and photometrically with the LR peak action frame;
obtaining a motion map by estimating motion differences between the aligned first HR frame and the LR peak action frame;
blending the aligned first HR frame and the LR peak action frame using the motion map; and
generating the HR peak action frame with high resolution components in a background and one or more peak action regions based on the blending of the aligned first HR frame and the LR peak action frame.

7. The method of claim 1, further comprising:
receiving an image stream with the second frame speed;
detecting an action recoil cue based on a movement of the at least one subject;
predicting an arrival time of a peak action frame based on the detected action recoil cue;
obtaining a slow motion start time and a slow motion end time based on at least one of the arrival time of the peak action frame, a slow motion buffer size and a target frame speed, the target frame speed greater than the second frame speed;
modifying a frame rate of the received image stream to the target frame speed; and
generating a slow motion video segment for the slow motion start time and the slow motion end time based on the modified frame rate.

8. An electronic device comprising:
a memory storing one or more instructions; and
one or more processors operably coupled to the memory and configured to execute the one or more instructions to:
receive a low resolution (LR) image stream with a first frame speed and a high resolution (HR) image stream with a second frame speed, the first frame speed being greater than the second frame speed, and the LR image stream having a resolution lower than the HR image stream;

detect at least one pose of at least one subject in the LR image stream;

obtain a LR peak action frame in the LR image stream based on the at least one pose;

identify a first HR frame from the HR image stream, the first HR frame being closest to the LR peak action frame, wherein the LR peak action frame include a peak of an action of the at least one subject.

9. The electronic device of claim 8, wherein the one or more processors is further configured to execute the one or more instructions to:

receive the LR image stream;

analyze the LR image stream with a deep neural network (DNN); and detect the at least one pose, wherein the at least one pose indicates a beginning of an action by the at least one subject using the DNN.

10. The electronic device of claim 8, wherein the one or more processors is further configured to execute the one or more instructions to:

initiate a video recording by a LR capture of a scene having the at least one subject;

detect the at least one pose of the at least one subject in the scene, the at least one pose indicating a beginning of an action by the at least one subject;

initiate an Artificial Intelligence (AI) module to track a path of the action of the at least one subject;

initiate a HR capture of the scene in parallel to the initiating of the AI module;

fetch at least two candidate frames closer to a peak of the action of the at least one subject from the LR image stream using the AI module;

obtain the LR peak action frame containing the peak of the action of the at least one subject from among the at least two candidate frames; and identify the first HR frame, which is closest to the LR peak action frame, from the HR image stream.

11. The electronic device of claim 8, wherein the one or more processors is further configured to execute the one or more instructions to:

generate at least one key point of the at least one subject using a deep neural network (DNN), detect an action recoil cue by matching optical flow of the at least one key point of the at least one subject with a pattern during the movement of the at least one subject;

identify at least one of velocity and angle of action of the at least one subject based on the movement of the at least one key point based on the action recoil cue;

predict time and location of a peak action of the at least one subject based on the identified at least one of velocity and angle of action of the at least one subject; and obtain the LR peak action frame based on the predicted time and location of the peak action and a number of LR frame capture per second.

12. The electronic device of claim 8, wherein the one or more processors is further configured to execute the one or more instructions to:

receive the HR image stream with low frame speed;

receive the LR peak action frame;

update an offset of the HR image stream based on the LR peak action frame; and identify the first HR frame which is closest to the LR peak action frame from the updated HR image stream.

13. The electronic device of claim 11, wherein the one or more processors is further configured to execute the one or more instructions to:

identify the first HR frame from the HR image stream which is closest to the LR peak action frame using the action recoil cue;

align the first HR frame at least one of geometrically and photometrically with the LR peak action frame;

obtain a motion map by estimating motion differences between the aligned first HR frame and the LR peak action frame;

blend the aligned first HR frame and the LR peak action frame based on the motion map; and generate the HR peak action frame with high resolution components in a background and a peak action regions.

14. The electronic device of claim 8, wherein the one or more processors is further configured to execute the one or more instructions to:

receive an image stream with low frame speed;

detect an action recoil cue based on the movement of the at least one subject;

predict an arrival time of a peak action frame based on the detected action recoil cue;

obtain a slow motion start time and end time based on at least one of the arrival time of the peak action frame, slow motion buffer size and target high frame speed;

modify a frame rate of the received image stream to the target high frame speed; and generate a slow motion video segment for the obtained slow motion start time and end time in accordance with the modified frame rate.

15. The electronic device of claim 8, wherein the one or more processors is further configured to execute the one or more instructions to:

receive an image stream;

detect an action recoil cue in the image stream based on a movement of the at least one subject; and adjust a zoom factor based on the detected action recoil cue.

* * * * *